US011684033B2

United States Patent
Hellmers et al.

(10) Patent No.: US 11,684,033 B2
(45) Date of Patent: Jun. 27, 2023

(54) MILK FROTHING DEVICE

(71) Applicant: BREVILLE PTY LIMITED, Alexandria (AU)

(72) Inventors: Duncan Bruce Hellmers, Alexandria (AU); Giovanni Baez, Alexandria (AU); Norman Oliveria, Alexandria (AU); Gerard White, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 202 days.

(21) Appl. No.: 16/762,483

(22) PCT Filed: Nov. 7, 2018

(86) PCT No.: PCT/AU2018/000215
§ 371 (c)(1),
(2) Date: May 7, 2020

(87) PCT Pub. No.: WO2019/090379
PCT Pub. Date: May 16, 2019

(65) Prior Publication Data
US 2021/0007319 A1 Jan. 14, 2021

(30) Foreign Application Priority Data

Nov. 8, 2017 (AU) ................................ 2017904530
May 10, 2018 (AU) ................................ 2018901605

(51) Int. Cl.
*A01J 11/00* (2006.01)
*A01J 11/04* (2006.01)
*A47J 43/044* (2006.01)

(52) U.S. Cl.
CPC ............. *A01J 11/04* (2013.01); *A47J 43/044* (2013.01); *A47J 2043/04472* (2013.01)

(58) Field of Classification Search
CPC ................................ A01J 11/04; A47J 43/044
See application file for complete search history.

(56) References Cited

U.S. PATENT DOCUMENTS

| 1,796,278 A | 3/1931 | Bakewell |
| 2,004,373 A | 6/1935 | Lutes |

(Continued)

FOREIGN PATENT DOCUMENTS

| CN | 103284601 A | 9/2013 |
| CN | 203852248 U | 10/2014 |

(Continued)

OTHER PUBLICATIONS

Supplementary European Search Report for Application No. EP18876130 dated Jun. 17, 2021.

(Continued)

*Primary Examiner* — Anshu Bhatia
(74) *Attorney, Agent, or Firm* — Moser Taboada

(57) ABSTRACT

There is disclosed herein a frothing assembly (21) to froth milk in a container (11). The assembly (21) includes: a body (25); a motor (33) fixed to the body and having an output shaft (34) that is rotatably driven about a longitudinal axis (35) of the shaft (34); a frothing device (36) rotatably driven by the shaft (34) and to be submerged in the milk in the container (11); and a perforated member (43) at least partly surrounding the frothing device (36) and spaced from the frothing device (36) by a clearance (44), wherein rotation of the frothing device (36) causes movement of milk in the clearance (44) and movement of milk through the perforated member (43) to be circulated back through the container (11) and the clearance (44) to cause frothing of the milk.

14 Claims, 25 Drawing Sheets

(56) References Cited

U.S. PATENT DOCUMENTS

2005/0029685 A1    2/2005  Zhao
2005/0259508 A1  11/2005  Rohde
2016/0015218 A1    1/2016  Kolar
2016/0016133 A1    1/2016  Merritt et al.

FOREIGN PATENT DOCUMENTS

| | | | | |
|---|---|---|---|---|
| GB | 2438596 A | * | 12/2007 | .......... A47J 31/4489 |
| RU | 2010127335 A | | 1/2017 | |
| WO | WO-2011043784 A1 | | 4/2011 | |
| WO | WO-2014/201753 A1 | | 12/2014 | |
| WO | WO-2014201753 A1 | | 12/2014 | |
| WO | WO-2016205345 A1 | * | 12/2016 | .............. A47J 43/07 |

OTHER PUBLICATIONS

International Search Report on Application No. PCT/AU2018/000215 dated Dec. 21, 2018.

\* cited by examiner

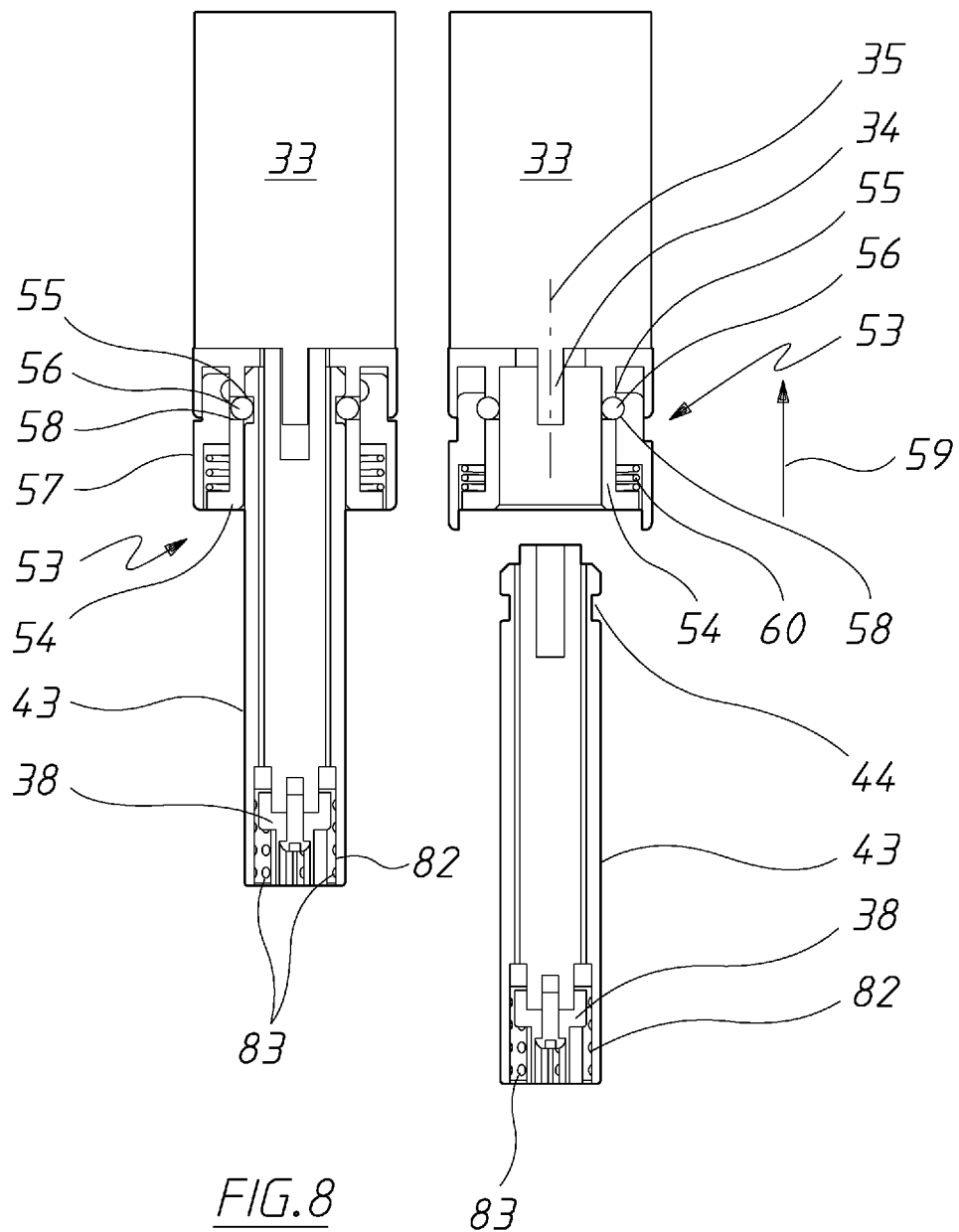

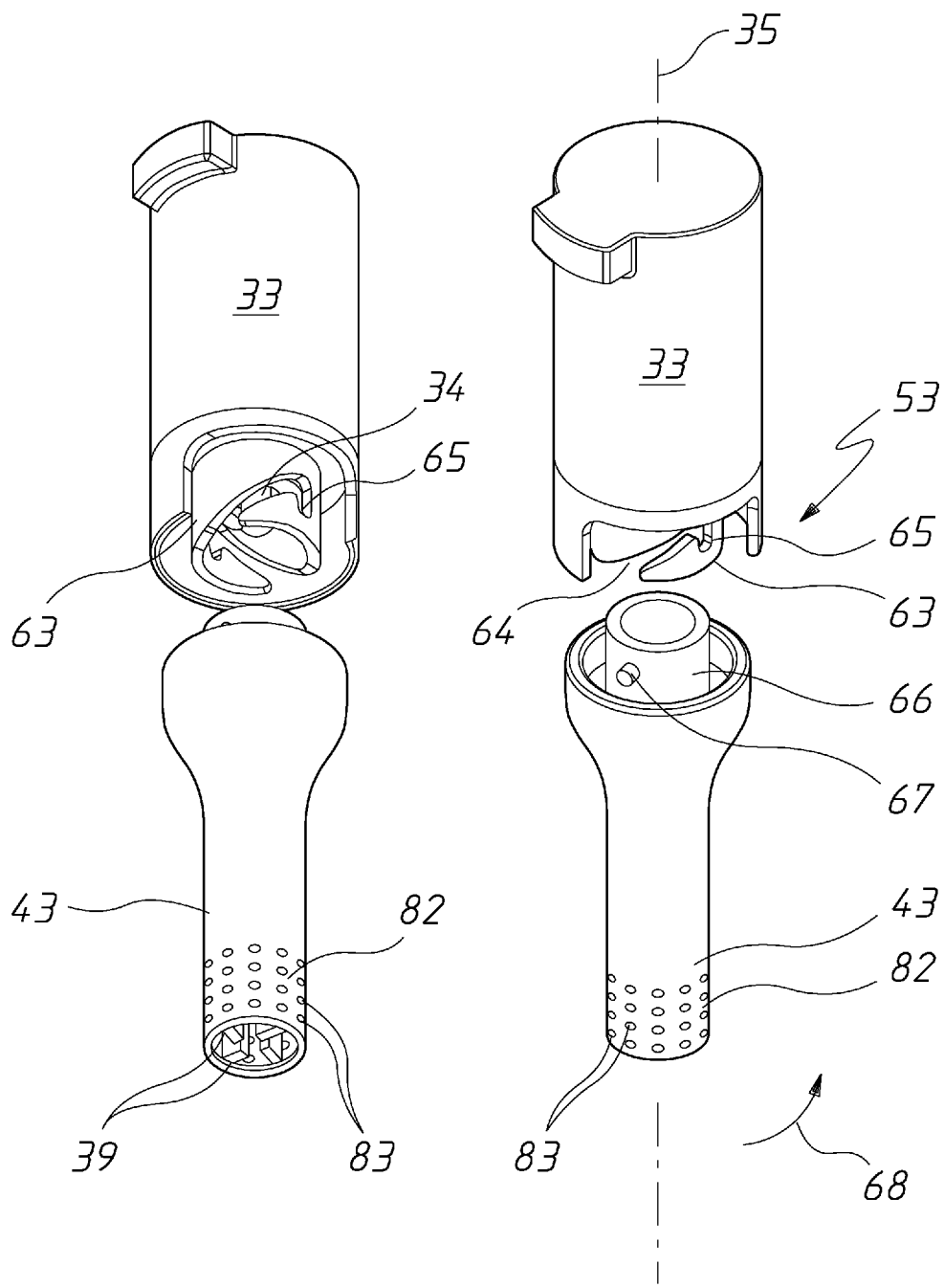

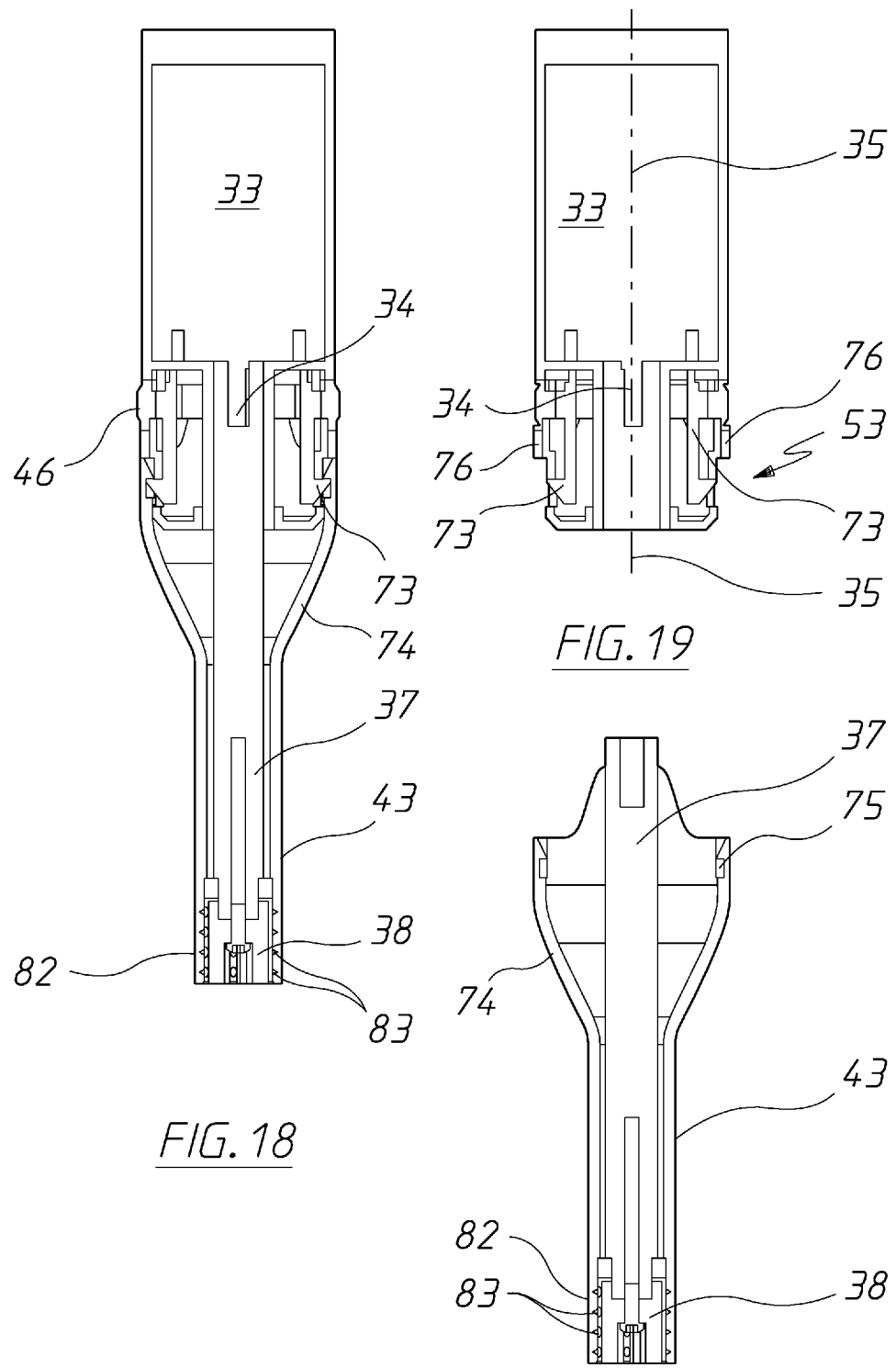

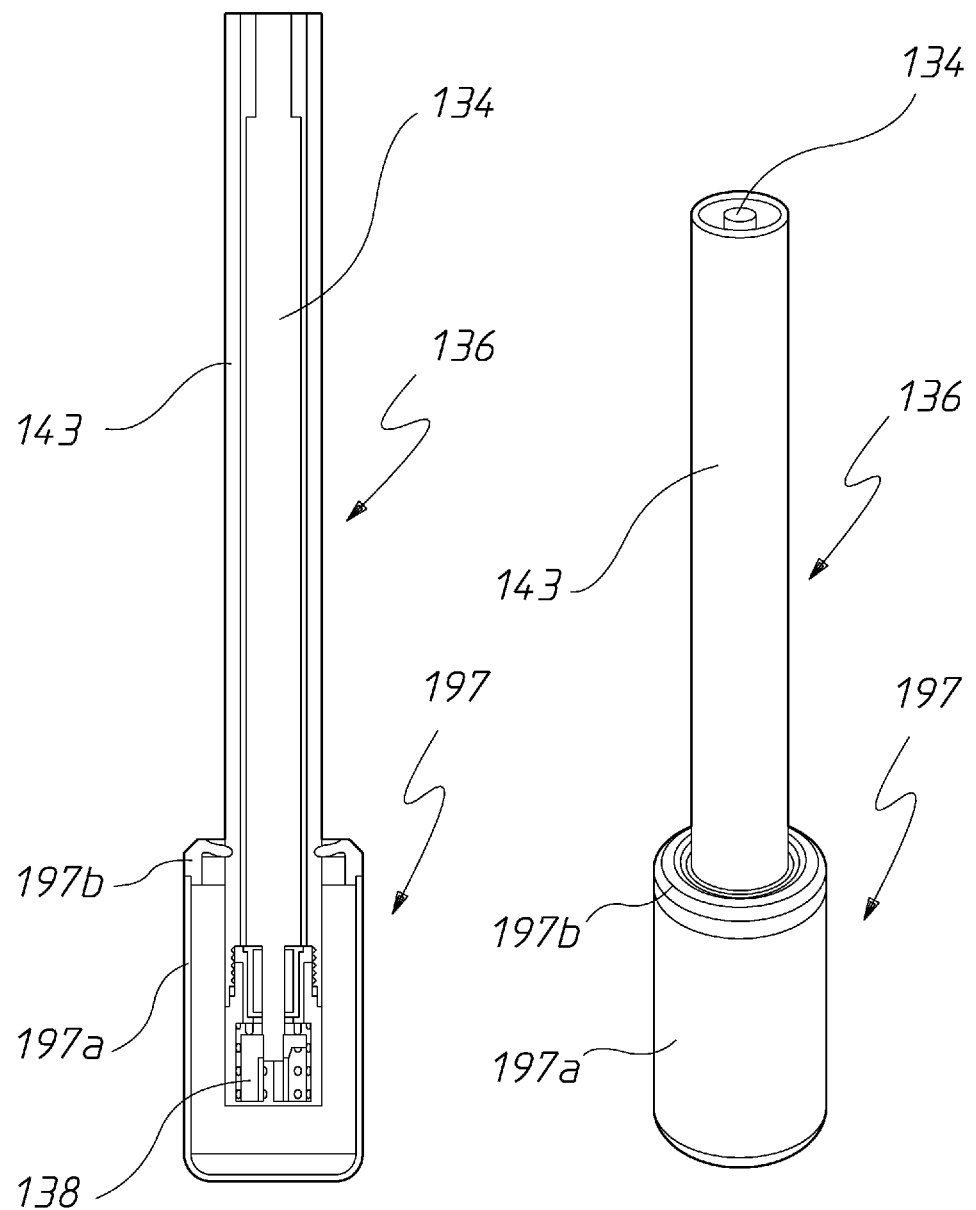

MILK FROTHING DEVICE

FIELD OF THE INVENTION

The present invention relates to milk frothing or texturing and more particularly to mechanical texturing or frothing.

BACKGROUND OF THE INVENTION

Texturing is adding air bubbles to milk. Heated and textured milk is needed to make popular beverages like cappuccino and latte.

The primary benefit of mechanical texturing over steam texturing is the resultant flavour of the milk. Steam tends to add some water into the milk thereby diluting it and the high temperature destroys some of the natural sweetness of the milk. Using a whisk to create a vortex thereby drawing air into the milk arguably has some advantages.

Milk frothing devices are known from the following publications: Foremost B V, Publication US 2012/0017778 (Milk Frother), Aerolatte Limited, patent number U.S. Pat. No. 6,558,035 (Electric Whisk), Chinese patent CN 201683731 (Fully-Automatic Milk Frother), Green Lane Designs, U.S. Pat. No. 8,726,790 (Milk Frothing Device) and Tito Ciusti, GB604048A (Improvement in or related to Pasteurising and boiling apparatus).

A disadvantage of devices that steam textured milk, is that is poor control of the temperature of the milk, while also diluting the milk. A disadvantage of "whisk" type devices is that the milk may not be froth or textured to a desired degree.

OBJECT OF THE INVENTION

It is the object of the present invention to overcome or substantially ameliorate at least one of the above disadvantages.

SUMMARY OF THE INVENTION

There is disclosed herein a frothing assembly to froth milk in a container, the assembly including:
a body;
a motor fixed to the body and having an output shaft that is rotatably driven about a longitudinal axis of the shaft;
a frothing device rotatably driven by the shaft and to be submerged in the milk in the container; and
a perforated member at least partly surrounding the frothing device and spaced from the frothing device by a clearance;
wherein rotation of the frothing device causes movement of milk in the clearance and movement of milk through the perforated member to be circulated back through the container and the clearance to cause frothing of the milk.

Preferably, the frothing device includes a plurality of blades that are spaced angularly about said axis, and that have a direction of extension away from said axis that includes a radial component.

Preferably, the direction of extension also includes an angular component.

Preferably, each of the blades is generally flat.

Preferably, the perforated member has an end portion providing a plurality of passages through which the milk may pass.

Preferably, said end portion is at least partly coextensive with the blades in the direction of said axis.

Preferably, said end portion is substantially coextensive with the blades in the direction of said axis.

Preferably, the frothing device and perforated member provides an assembly that is detachable with respect to the motor.

Preferably, said clearance is annular, and is 0.5 to 1.00 mm.

Preferably, the clearance is about 0.5 mm.

There is further disclosed herein a frother for milk, the frother including a base to support the above container and to which the frothing assembly is attached.

Preferably, the milk frother includes a stem fixed to an extending upwardly from the base, to which the frothing assembly is attached.

Preferably, the frothing assembly is longitudinally adjustable in position on the stem to adjust height of the frothing device relative to the container.

Preferably, the motor is located above the perforated member, with the perforated member extending downwardly from the motor to be at least partly submerged in milk in the container.

Preferably, the base includes a device to heat the milk in the container.

Preferably, the base includes a temperature sensor to detect temperature of the container and therefore the milk.

Preferably, the frother includes circuitry to control the motor and to receive a signal from the sensor, and to control the heater.

Preferably, the circuitry activates the motor to rotate the frothing device at a rotation velocity of about 5,500 rpm to about 13,500 rpm.

Preferably, the circuitry activates the motor to rotate the frothing device at a rotational velocity of about 13,500 rpm for a period, and then at about 9,500 rpm for a further period.

There is further disclosed herein a milk frother to froth milk in a container, the milk frother including:
a base assembly for supporting the container, the base assembly including a source of fluid; and
a frothing assembly attached to the base assembly, the frothing assembly including:
  a body;
  a motor fixed to the body and having an output shaft that is rotatably driven about a longitudinally axis of the output shaft, the output shaft including a hollow channel in communication with the source of fluid;
  a frothing device rotatably driven by the shaft and to be submerged in the milk in the container; and
  a perforated member at least partly surrounding the frothing device and spaced from the frothing device by a clearance, the perforated member being in communication with the hollow channel of the output shaft,
  wherein rotation of the frothing device causes movement of milk in the clearance and movement of milk through the perforated member to be circulated back through the container and the clearance to cause frothing of the milk; and
  whereby the source of fluid is operable to cause fluid to be dispensed through the hollow channel and the perforated member.

There is still further disclosed herein a milk frother to froth milk in a container, the milk frother including:
a base assembly having a body to support the container; and
a frothing assembly at least partially mounted in the body of the base assembly, the frothing assembly including:

a motor having an output shaft that is rotatably driven about a longitudinally axis of the shaft;

a frothing device rotatably driven by the shaft and to be submerged in the milk in the container; and a perforated member at least partly surrounding the frothing device and spaced from the frothing device by a clearance;

wherein rotation of the frothing device causes movement of milk in the clearance and movement of milk through the member to be circulated back through the container and the clearance to cause frothing of the milk.

BRIEF DESCRIPTION OF THE DRAWINGS

Preferred forms of the present invention will now be described, by way of example only, with reference to the accompanying drawings in which:

FIG. 8 is a schematic sectioned side elevation of a modification of the frothing assembly of FIG. 1;

FIG. 9 is a further schematic sectioned side elevation of the frothing assembly of FIG. 8;

FIG. 14 is a schematic isometric view of a modification of the frothing assembly of FIG. 1;

FIG. 15 is a schematic isometric view of the frothing assembly of FIG. 14;

FIG. 18 is a schematic sectioned side elevation of a modification frothing assembly of FIG. 1;

FIG. 19 is a schematic sectioned side elevation of portion of the frothing assembly of FIG. 18;

FIG. 20 is a schematic sectioned side elevation of portion of the frothing assembly of FIG. 18;

FIG. 25 is a schematic sectioned side elevation view of a first embodiment of a cleaning device of the milk frother of FIG. 23;

FIG. 26 is a schematic isometric view of the cleaning device of FIG. 25;

DETAILED DESCRIPTION OF THE EMBODIMENTS

Figure 1:
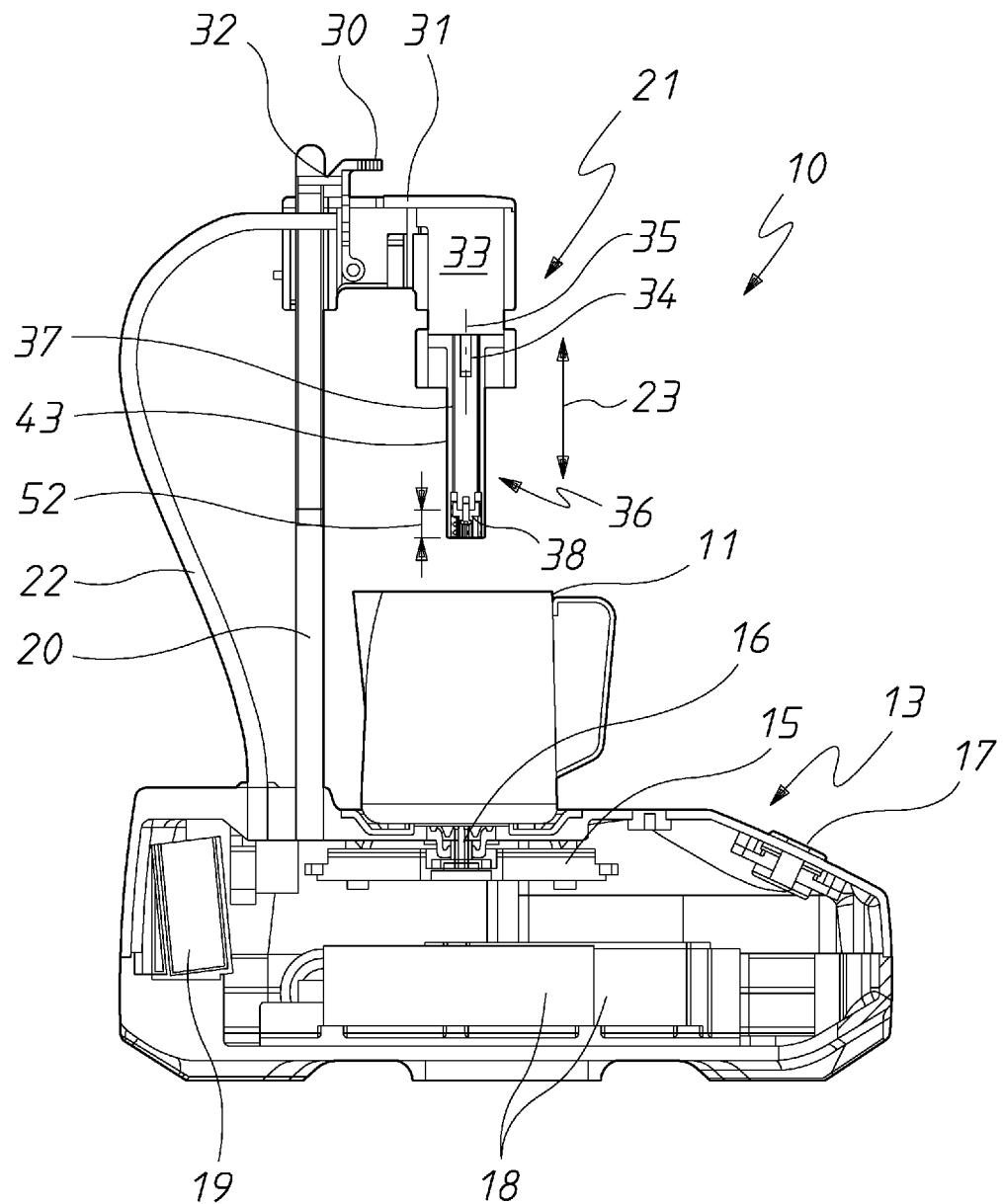
FIG. 1 is a schematic parts sectioned side elevation of a first embodiment of a milk frother.

In FIGS. 1 to 7 of the accompanying drawings there is schematically depicted a first embodiment of a milk frother 10. The milk frother 10 includes a container (jug) 11 that is to receive milk 12 to froth the milk.

The milk frother 10 includes a base assembly 13 providing a housing 14 within which there is mounted an induction coil 15 to heat the container 11 and milk 12.

Also mounted in the housing 14 is a temperature sensor 16 to detect the temperature of the container 11 (and therefore the milk 12) and provide a signal indicative thereof.

Also mounted in the housing 14 is a user interface 17 that a user may manipulate to control the milk frother 10.

The interface 17 is operatively associated with a microprocessor and control circuitry 18 that operates the induction coil 15 and receives signals generated by the temperature sensor 16.

The circuitry 18 also operates a fan 19 to cause air to flow through the housing 14 to cool componentry located therein.

Supported on a stem 20 fixed to the base assembly 13 is a milk frothing assembly 21. The assembly 21 is also electrically coupled to the circuitry 18 by means of an electric conduit 22, so as to be controlled by the circuitry 18.

The assembly 21 is mounted on the stem 20 so as to be height adjustable in the direction 23 relative to the container 11 resting on the base assembly 13.

Figures 2, 3:
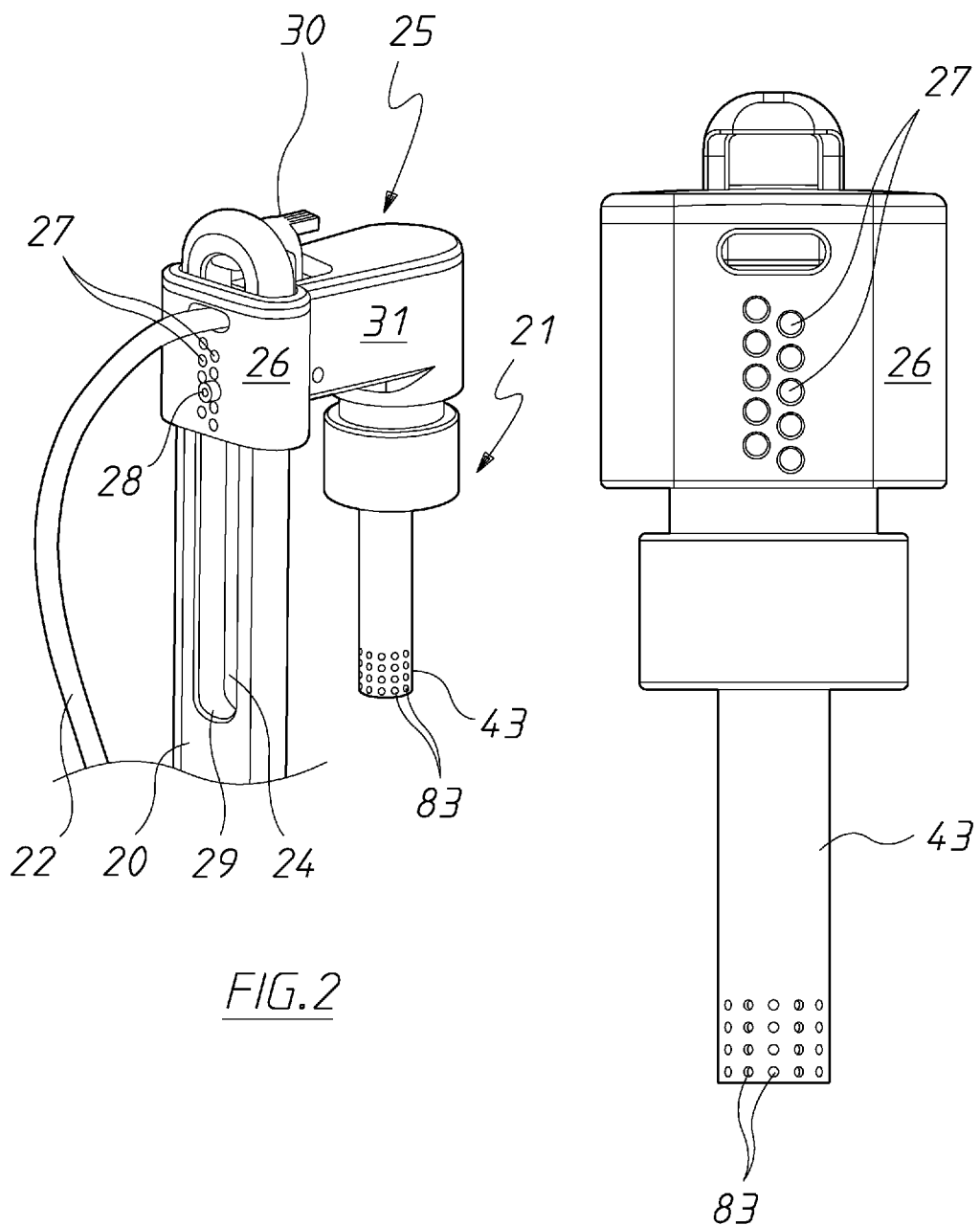
FIG. 2 is a schematic isometric view of a frothing assembly of the milk frother of FIG. 1.
FIG. 3 is a schematic front elevation of the frothing assembly of FIG. 2.
Figure 4:
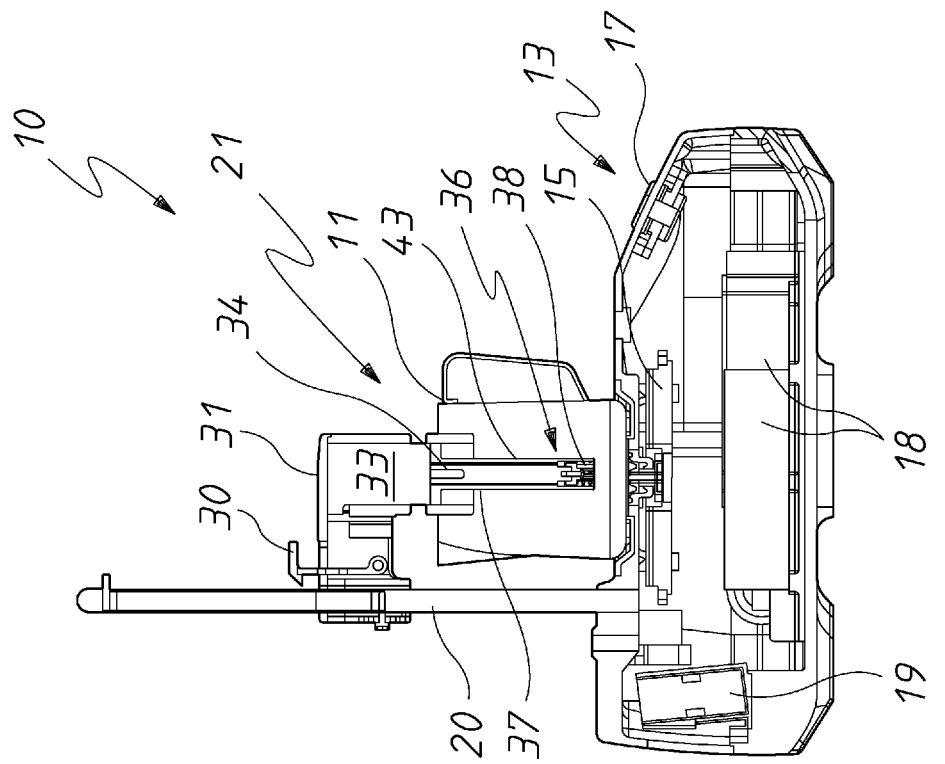
FIG. 4 is a further schematic sectioned side elevation of the milk frother of FIG. 1.
Figure 5:
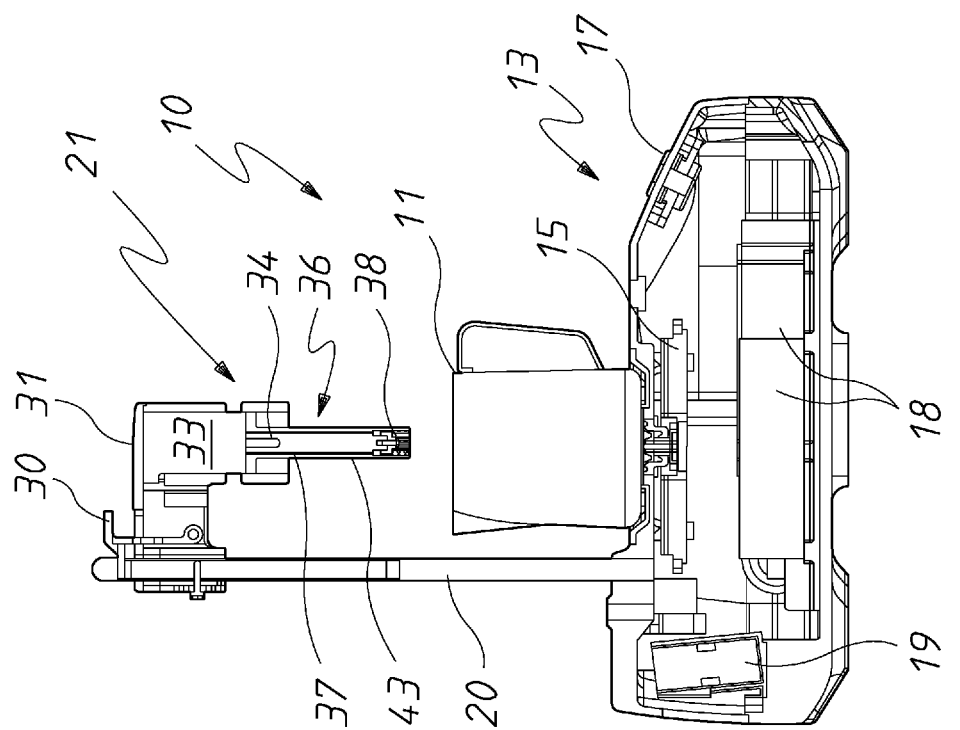
FIG. 5 is a still further sectioned side elevation of the milk frother of FIG. 1.

The stem 20 (as best seen in FIG. 2) includes an upwardly extending slot 24 that provides for height adjustment of the assembly 21.

The assembly 21 is attached to the stem 20 by means of a mounting 25. The mounting 25 includes a sleeve 26 that is slidable on the stem 20 in the direction 23. The stem 20 passes through the sleeve 16 so that movement of the mounting 25 slidably along the stem 20 maintains the assembly 21 in the orientation as depicted.

The sleeve 26 has a plurality of threaded apertures 27 that receive a stop member (threaded fastener) 28. The stop member 28 passes through the slot 24, and engages the lower end 29 of the slot 24 to position the assembly 21 at a desired height. This height is adjustable by engagement of the stop member 28 in a selected one of the apertures 27, as the apertures 27 are arranged at different heights, that is different locations in the direction of the slot 24.

The mounting 25 also includes a body 31 extending generally horizontally from the sleeve 26 to which it is affixed.

Pivotally mounted on the body 31 is a catch 30, for angular movement about a generally horizontal axis, that is an axis generally perpendicular to the direction 23 and perpendicular to the stem 20. The catch 30 is angularly movable between a catch position (as shown in FIG. 1) engaging a flange or step 32 of the sleeve 26 to retain the frothing assembly 21 at the raised position as shown in FIG. 1, and a release position spaced from the step 32 so that the assembly 21 may be moved to a lowered position determined by the location of the stop member 28 with engagement with the end 29.

The frothing assembly 21 includes a motor 33 connected to the conduit 22 so as to receive electric power therefrom and to be controlled by the circuitry 18. The motor 33 rotatably drives a shaft 34 about a longitudinal axis 35 of the shaft 34, so as to have a rotational speed of about 5,500 rpm to about 13,500 rpm. The shaft 34 causes operation of a frothing device 36. The frothing device 36 includes a central longitudinal shaft 37 that is provided at its lower end with an impeller 38. In this embodiment the impeller 38 includes a plurality of blades 39 fixed to the shaft 37 so as to rotate therewith. The shaft 37 is fixed to the shaft 34 so as to be driven thereby about the axis 35. The blades 39 are spaced angularly about the axis 35. The device 36 has the same rotational speed as the motor 33. Preferably, the circuitry 18 controls the motor 33 to rotate the shaft 34, and therefore the device 36 at a rotational velocity of about 9,500 rpm for a first period, then at about 13,500 for a second period.

Preferably, the blades 39 have a direction of extension away from the shaft 37 that includes a radial component. More preferably, the blades 39 also have a direction of extension away from the shaft 37 that also includes an angular component. In the longitudinal direction the blades 39 are generally parallel to the axis 35. Preferably the blades are generally planar and inclined to a radius 40 by an acute angle 41. Preferably, the blades 39 are angularly equally spaced about the axis 35.

The impeller 38 is driven in a rotational direction 42 with each blade being inclined in the direction 42 from the adjacent radius 40 by the angle 41.

The frothing assembly 21 includes a perforated member 43 surrounding the impeller 38. In this embodiment, the perforated member 43 is cylindrical in configuration and is spaced from the radially outer extremities of the blades 39 by a clearance 44. Accordingly, there is an annular space 45 surrounding the impeller 38. The member 43 has a lower end portion 82. The member 43 has a lower end portion 82 that has a plurality of radial passages 83 through which the milk flows. However, there is shearing of the milk between the impeller 38 and the member 43 to at least aid in frothing the milk.

In use of the above milk frother 10, the motor 33 is driven at an angular speed of 5,500 rpm, to 13,500 rpm, with the impeller 38 having four blades 39. The container 11 is cylindrical in configuration so as to have a diameter 46, with the milk having a depth 47. Preferably, the lower end extremity of the frothing device 36 is spaced from the base 48 of the container 11 by a depth 49. Preferably, the member 43 has a diameter 50 and the impeller 38 a diameter 51. Preferably, the blades 39 have a longitudinal length 52 in the direction 23. The blades 39 are generally co-extensive with the portion 82 in the direction of the axis 35.

Preferably, the depth 47 is approximate the internal diameter 46. Preferably, the length 52 is ¼ to ⅙ of the diameter 51. Preferably, the depth is ½ to ⅙ of the depth 47. Preferably, the diameter 51 is a four to eight times the clearance 44 and most preferably about six times the clearance 44. Preferably, the clearance 44 is about 0.5 to about 1.00 mm, most preferably about 0.5 mm. Preferably, the angle 41 is 20° to 30° and most preferably about 25°.

Figure 6:
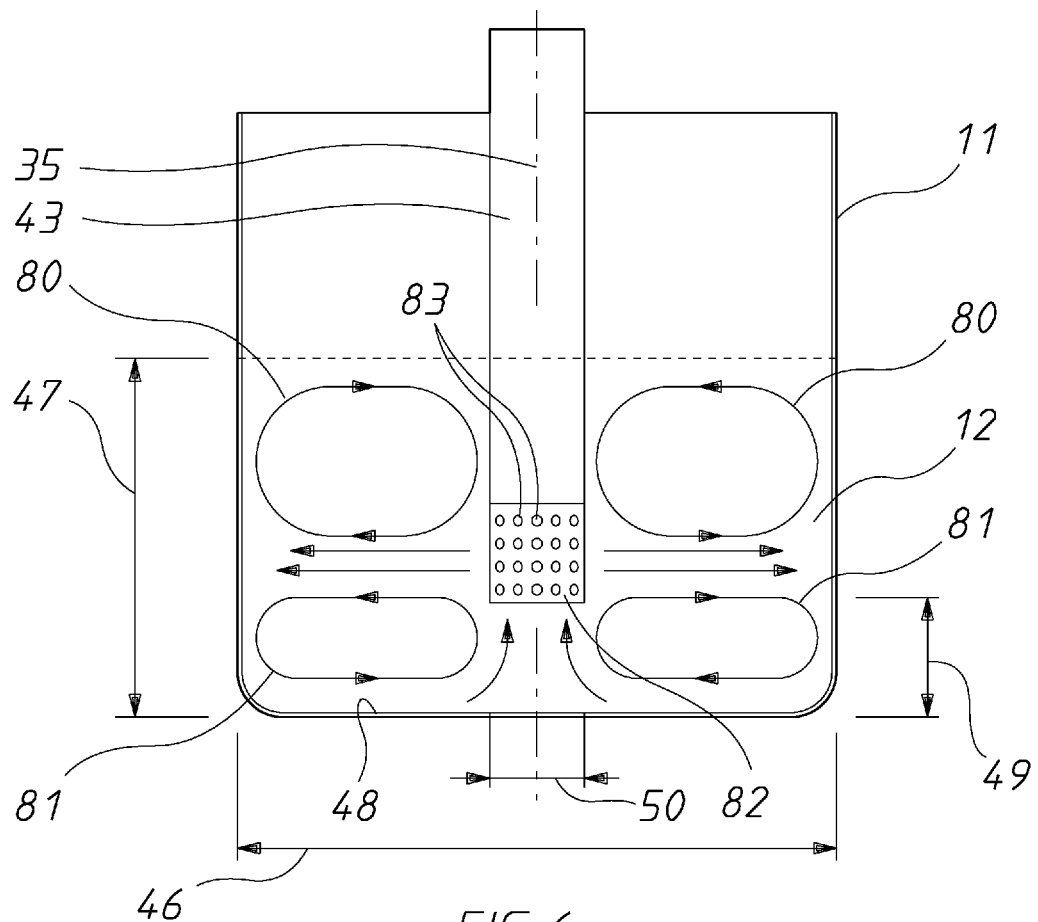
FIG. 6 is a schematic sectioned side elevation of a container used in the milk frother of FIG. 1, with portion of the frothing assembly.
Figure 7:
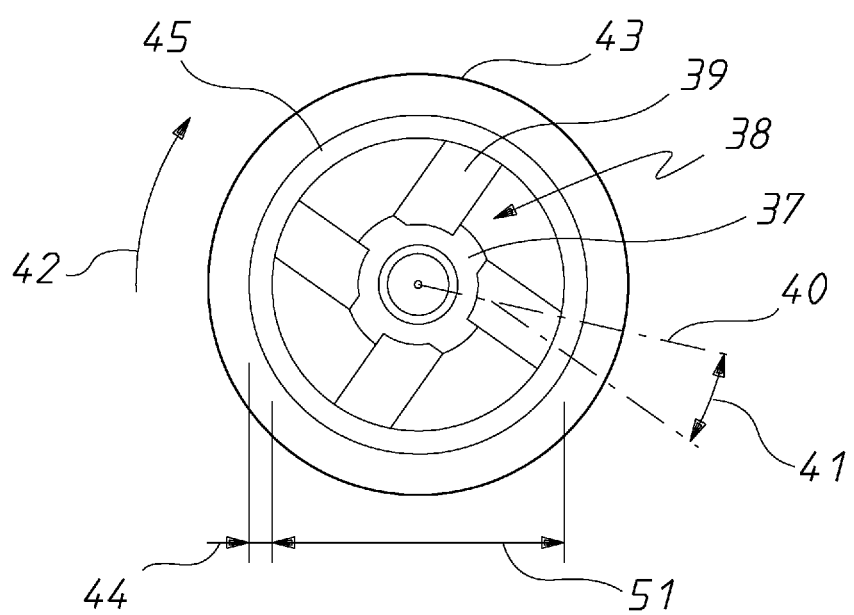
FIG. 7 is a schematic bottom plan view of the lower portion of the frothing assembly of FIG. 6.

As illustrated in FIG. 6, the milk frothing assembly 21 causes circulation of the milk 12 in the container 11. In particular, the assembly 21 causes circulation so that the milk moves angularly about the axis 35 in the direction 42. However, the assembly 21 also causes the milk to circulate to form annular vortexes 80 and 81. The vortexes 80 and 81 are annular with respect to the axis 35 with the milk circulating in the directions as indicated in FIG. 6. In particular, the milk is caused to move outwardly away from the perforated end portion 82 of the member 43 so as to have a radial component and a longitudinal component relative to the axis 35. Circulation of the milk 12 also provides for delivery of milk upwardly to the clearance 44, from a position adjacent the base 48 and generally centrally of the container 11. When engaged by the blades 39 the milk is caused to move outwardly in a radial direction through the passages 83 to again circulate In the embodiment of FIGS. 8 and 9, the shaft 37, member 43 and impeller 38 are detachable as an assembly from the motor 33. Fixed to the motor 33 is a catch assembly 53 that includes an internal sleeve 54 that has a plurality of apertures 55 each receiving a spherical element 56. The elements 56 are captively located in their respective apertures 55 that are movable radial relative to the axis 35 between inner and outer positions. The positions are determined by a slide 57. The slide 57 has a plurality of recesses 58 within which the elements 56 are received. The slide 57 is urged in the direction 59 by a spring 60 so that the elements 56 are urged radially inward. The member 43 at its upper end has an annular groove 44 within which the elements 56 are received to retain the assembly of the member 43, shaft 37 and rotor 38 attached to the motor 33 and drivingly engaged with the shaft 34. When the slide 57 is in the upper position, the slide 57 retains the elements 56 in the groove 44, thereby retaining the member 43 fixed to the motor 33. However, when the slide 57 is moved downward (opposite the direction 59) the elements 58 are permitted to move radially outward. Accordingly, from a user gripping and moving the member 43 downward, the elements 56 leave the groove 44 and allow the member 43 to be removed from the motor 33.

Figures 10, 12:
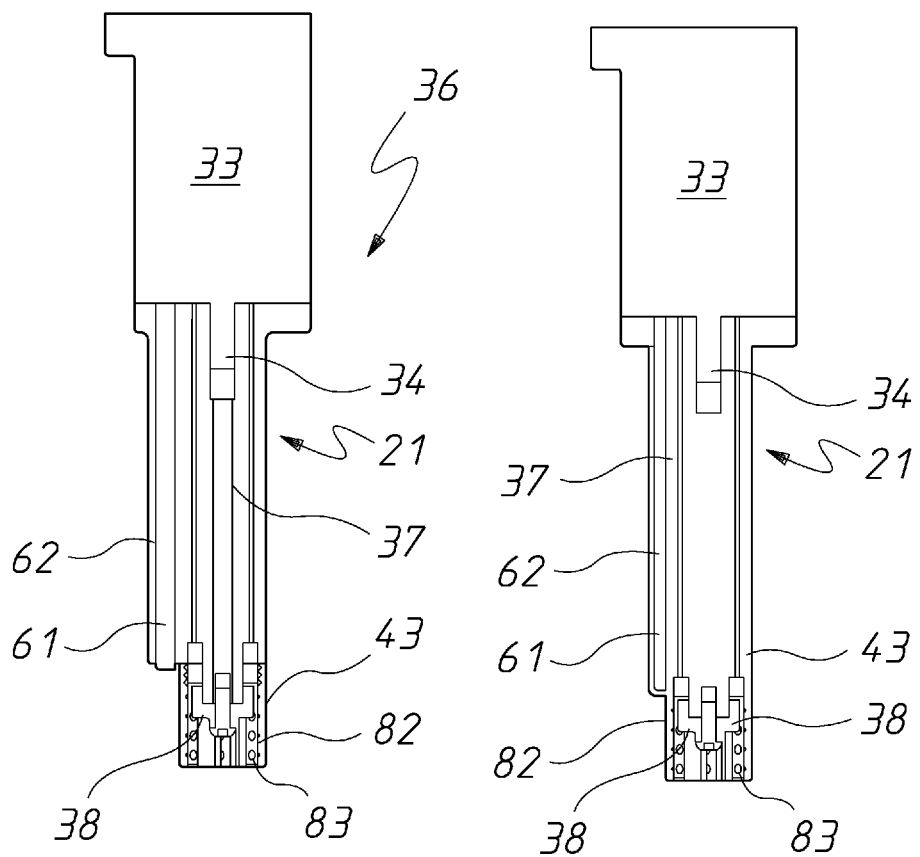
FIG. 10 is a schematic sectioned side elevation of a modification of the frothing assembly of FIG. 1.
FIG. 12 is a schematic sectioned side elevation of a modification of the frothing assembly of FIG. 1.
Figures 11, 13:
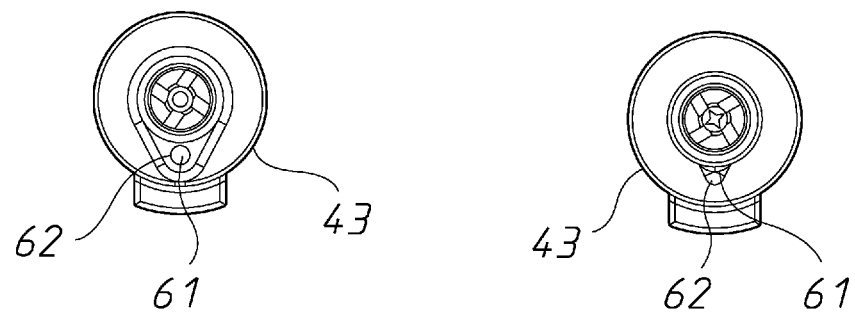
FIG. 11 is a schematic bottom plan view of the frothing assembly of FIG. 10.
FIG. 13 is a schematic bottom plan view of the frothing assembly of FIG. 12.

In the embodiment of FIGS. 10 and 11, the frothing device 36 is provided with a temperature sensor 61 that provides a signal indicative of the temperature of the milk 12. The sensors 61 communicates with circuitry 18 so that the circuitry 18 can best adapt operation of the induction coil 58 and frother 56 both in respect of duration, temperature and speed of operation, to optimise production of frothed milk.

In the embodiment of FIGS. 12 and 13, the temperature sensor 61 is encased in a chamber 62, while in the embodiment of FIGS. 10 and 11 the temperature sensor 61 projects outwardly of the chamber 62. In the embodiment of FIGS. 14 and 15, the catch assembly 53 has been modified. In this embodiment the catch assembly 53 is a "twist lock". In this embodiment there is fixed to the motor 33 a sleeve 63 that has an angularly extending slot 64 terminating with a recess 65. The slot 64 extends angularly about the axis 35 while the recess 65 extends in the direction of the axis 35. The assembly of the shaft 37, member 44 and rotor 38 is provided with a cylindrical portion 66 having opposed radially extending projections 67 that are received in the slots 64 and move angularly therealong to engage in the recesses 65 to securely attach the assembly of the member 43 and shaft 37 drivingly connected to the shaft 34 and secured to the motor 33. Angular movement of the cylindrical member 66 in the direction 68 engages the sleeve 66 with respect to the motor 33, while angular movement in an opposite direction to the direction 68 decouples the sleeve 66 from the motor 33.

Figures 16, 17:
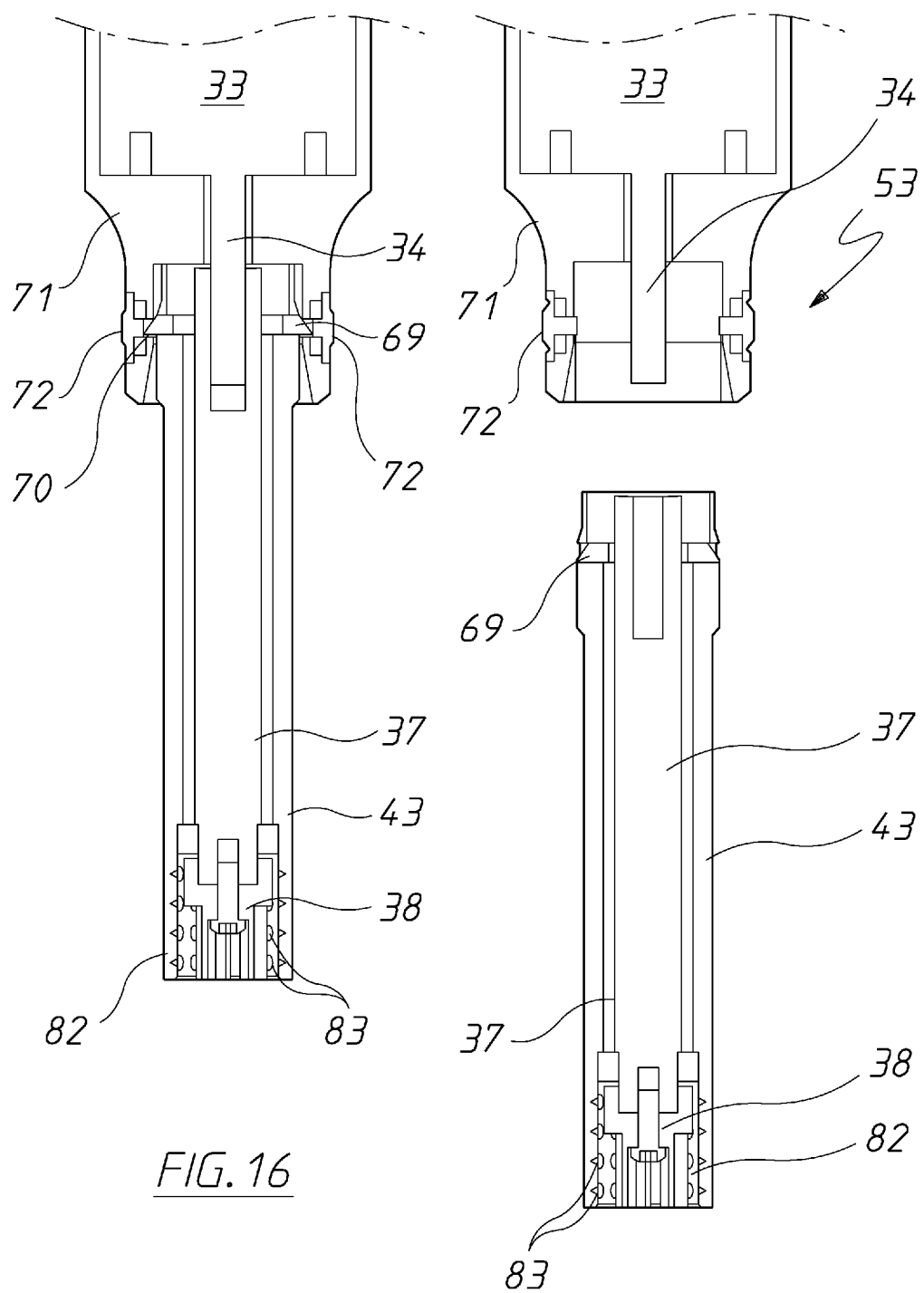
FIG. 16 is a schematic sectioned side elevation of a modification of the frothing assembly of FIG. 1.
FIG. 17 is a schematic sectioned side elevation of the frothing assembly of FIG. 16.

In the embodiments of FIGS. 16 and 17, the assembly of the member 44, shaft 37 and impeller 38 is releasably secured to the motor 33 again by a catch assembly 53. In this embodiment the catch assembly 53 includes a resilient ring 69 that is radially compressible relative to the axis 35 to a retracted position to provide for removal of the member 43 with respect to the motor 33, and a radially outer position (as shown in FIG. 16) in which the ring 69 engages in an annular recess 70 of a projection 71 fixed to the motor 33. When extending into the annular recess 70, the member 43 is fixed to the motor 33. Fixed to the projection 71 are tabs 72 that are pushed inwardly by a user to cause the ring 69 to compress and release the member 43. The ring 69 is resiliently urged outward to engage in the annular recess 70.

In the embodiment of FIGS. 18, 19 and 20, the catch assembly 73 includes a pair of opposing angularly movable pawls 73 fixed to the motor 33 and movable angularly towards the axis 35 to engage and disengage the member 43. The member 43 has an enlarged end portion 74 provided with an annular recess or spaced recesses 75 within which the end extremities of the pawls 73 engage. The pawls 73 are moved radially inward with respect to the axis 35 by a user engaging tabs 76 and moving them inwardly to cause angular movement of the pawls 73 radially inward to disengage from within the recesses 75.

Figures 21, 22:
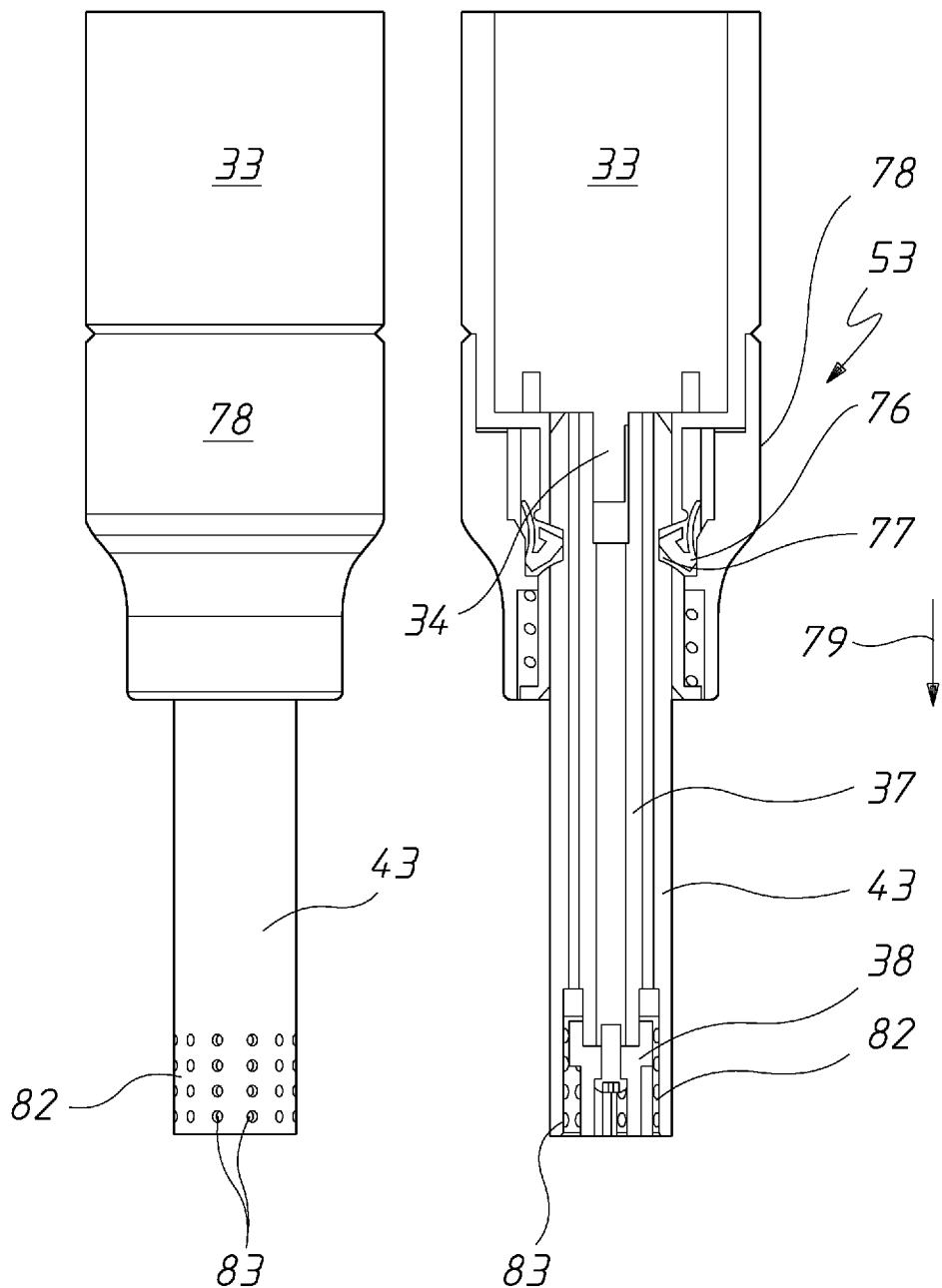
FIG. 21 is a schematic side elevation of a modification of the frothing assembly of FIG. 1.
FIG. 22 is a schematic sectioned side elevation of the frothing assembly of FIG. 21.

In the embodiment of FIGS. 20 and 21, the catch assembly 53 has an annular catch member 76 that projects radially inwardly to engage in an annular recess 77 in the upper end of the member 43. A user grips the sleeve 78 and moves the sleeve 78 in a direction parallel to the axis 35 to provide for movement of the member 76 radially with respect to the recess 77 for engagement and disengagement. In FIG. 22, the member 76 is retained in the recess 77 by the sleeve 78. If the sleeve 78 is moved downwardly in the direction 79, the member 76 under its own resilience, moves radially outward so as to exit the recess 77 to provide for removal of the member 43 with respect to the motor 33.

Figure 23:
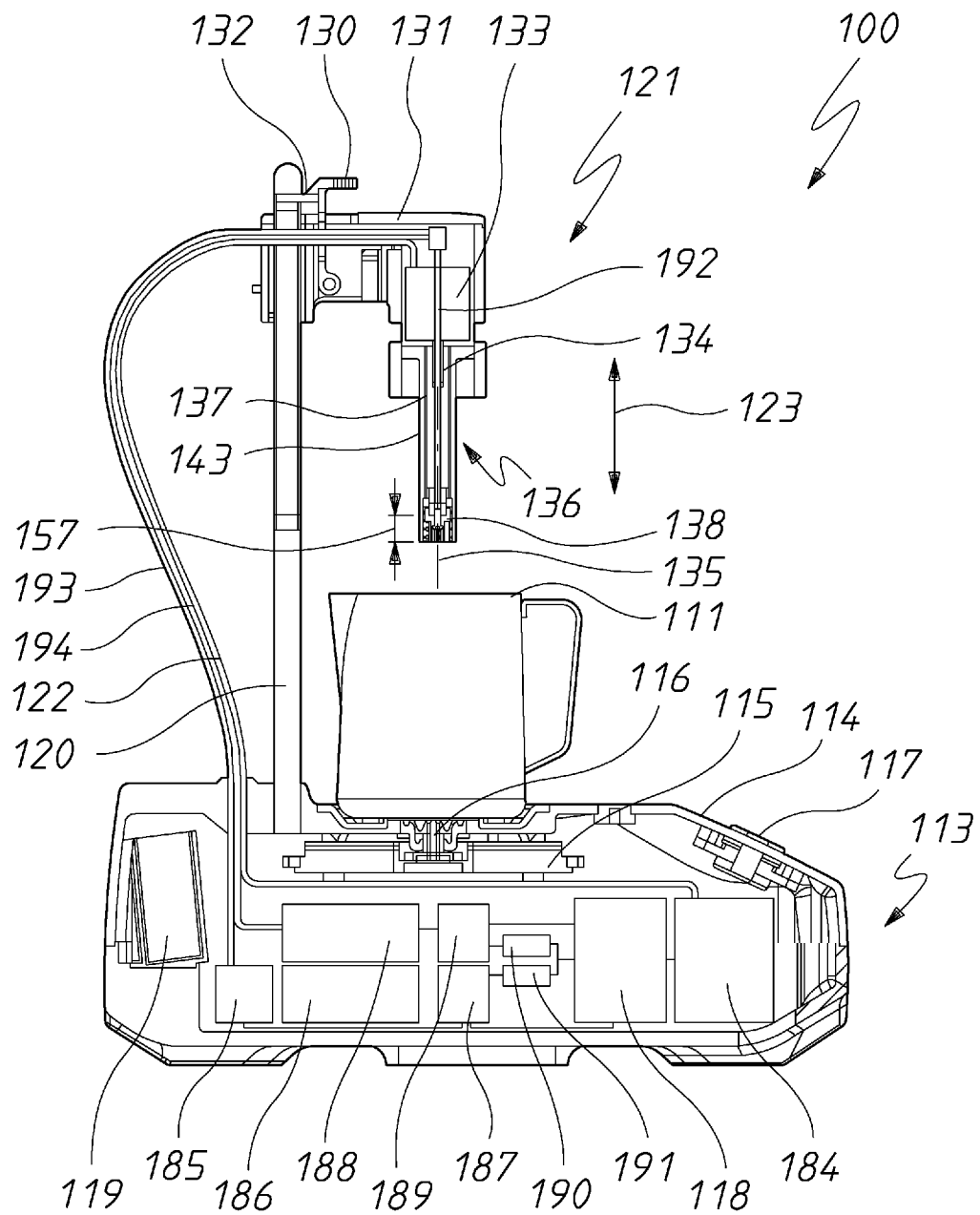
FIG. 23 is a schematic parts sectioned side elevation view of a second embodiment of milk frother.
Figure 24:
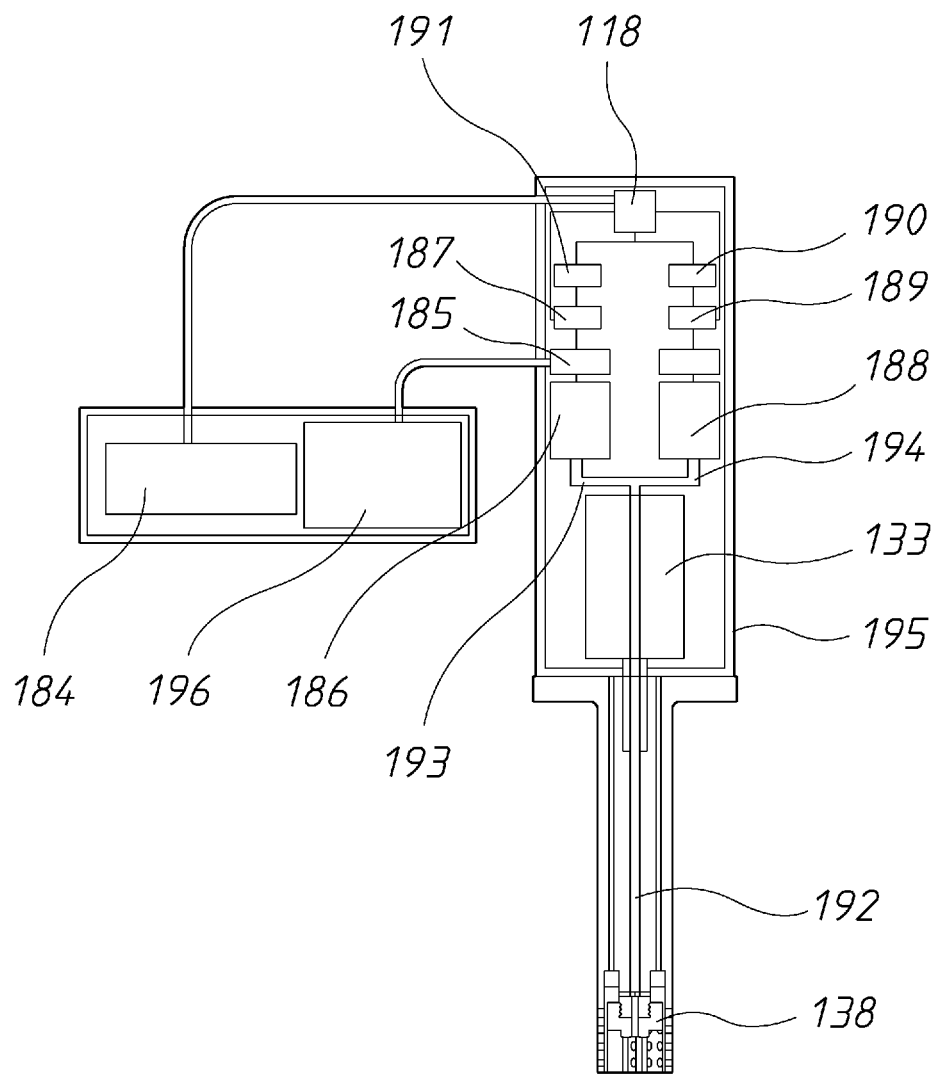
FIG. 24 is a schematic parts sectioned side elevation view of a modification of the frothing assembly of FIG. 23.
Figures 27, 28:
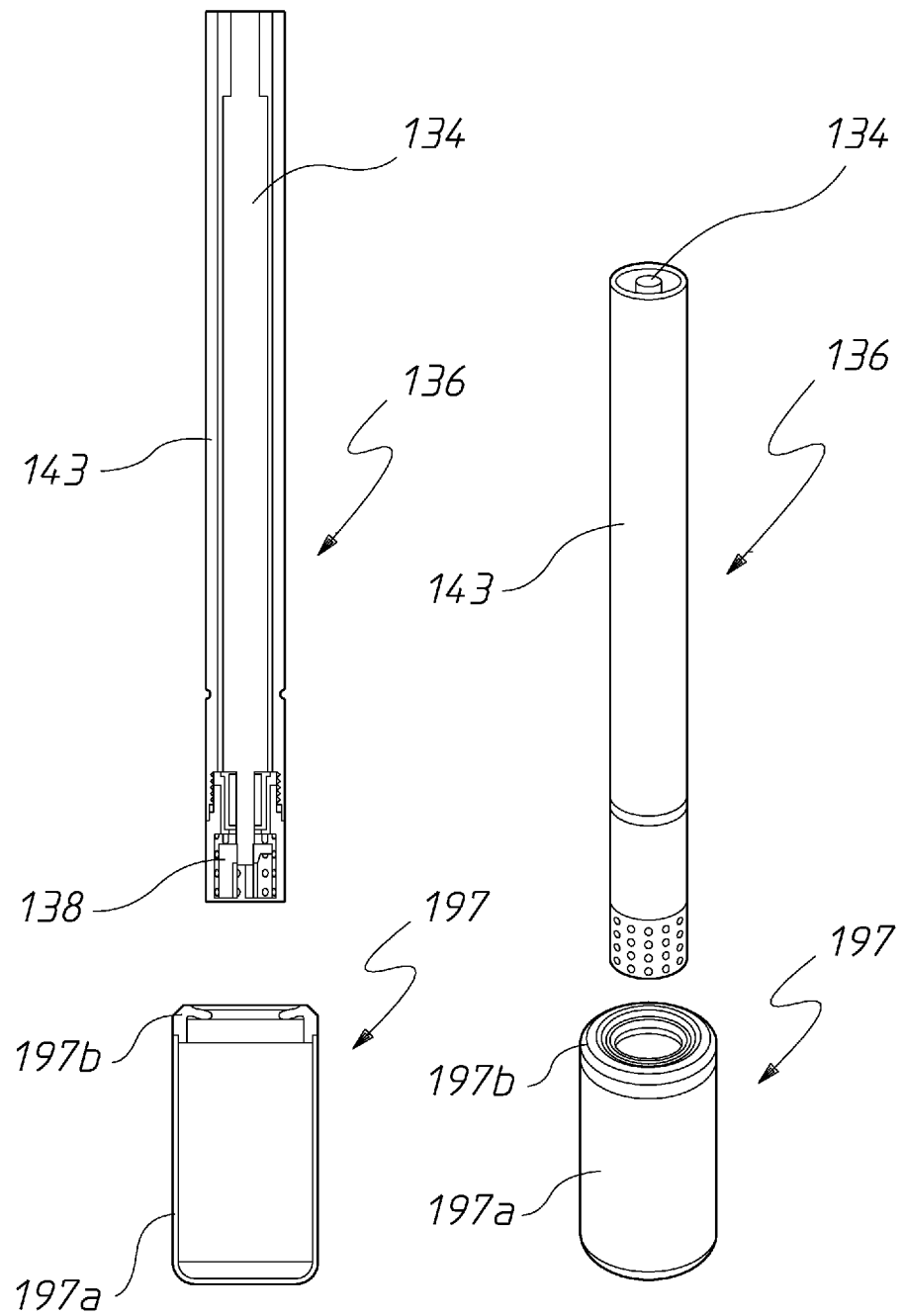
FIG. 27 is a further schematic sectioned side elevation view of the cleaning device of FIG. 25.
FIG. 28 is a further schematic isometric view of the cleaning device of FIG. 25.
Figure 29:
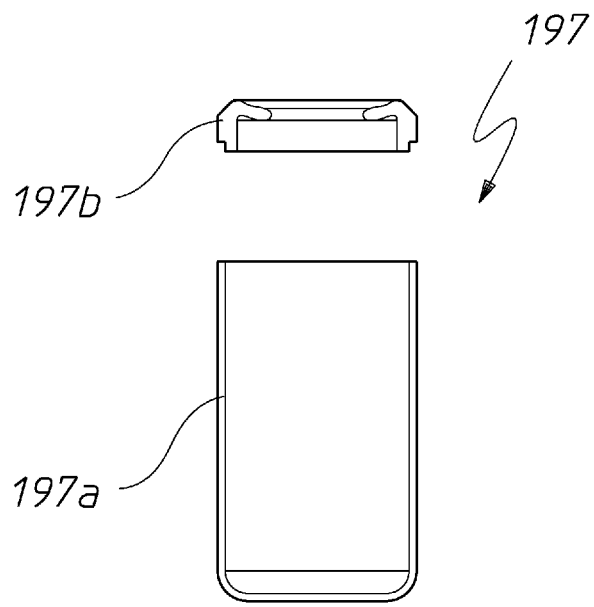
FIG. 29 is a further schematic sectioned side elevation view of the cleaning device of FIG. 25.
Figure 30:
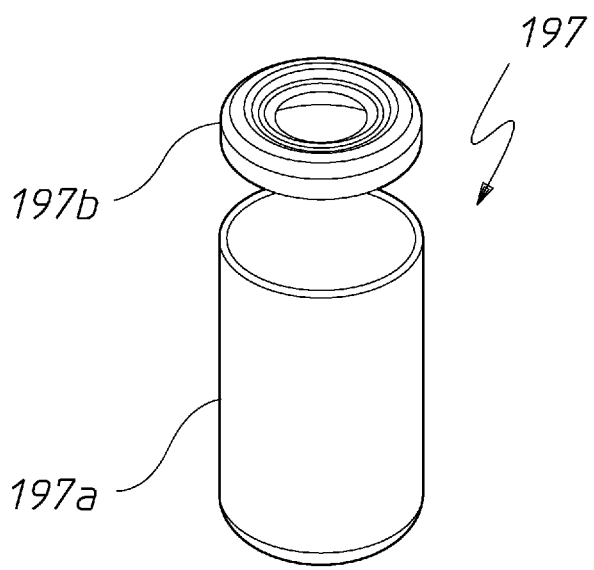
FIG. 30 is a further schematic isometric view of the cleaning device of FIG. 25.
Figures 31, 32:
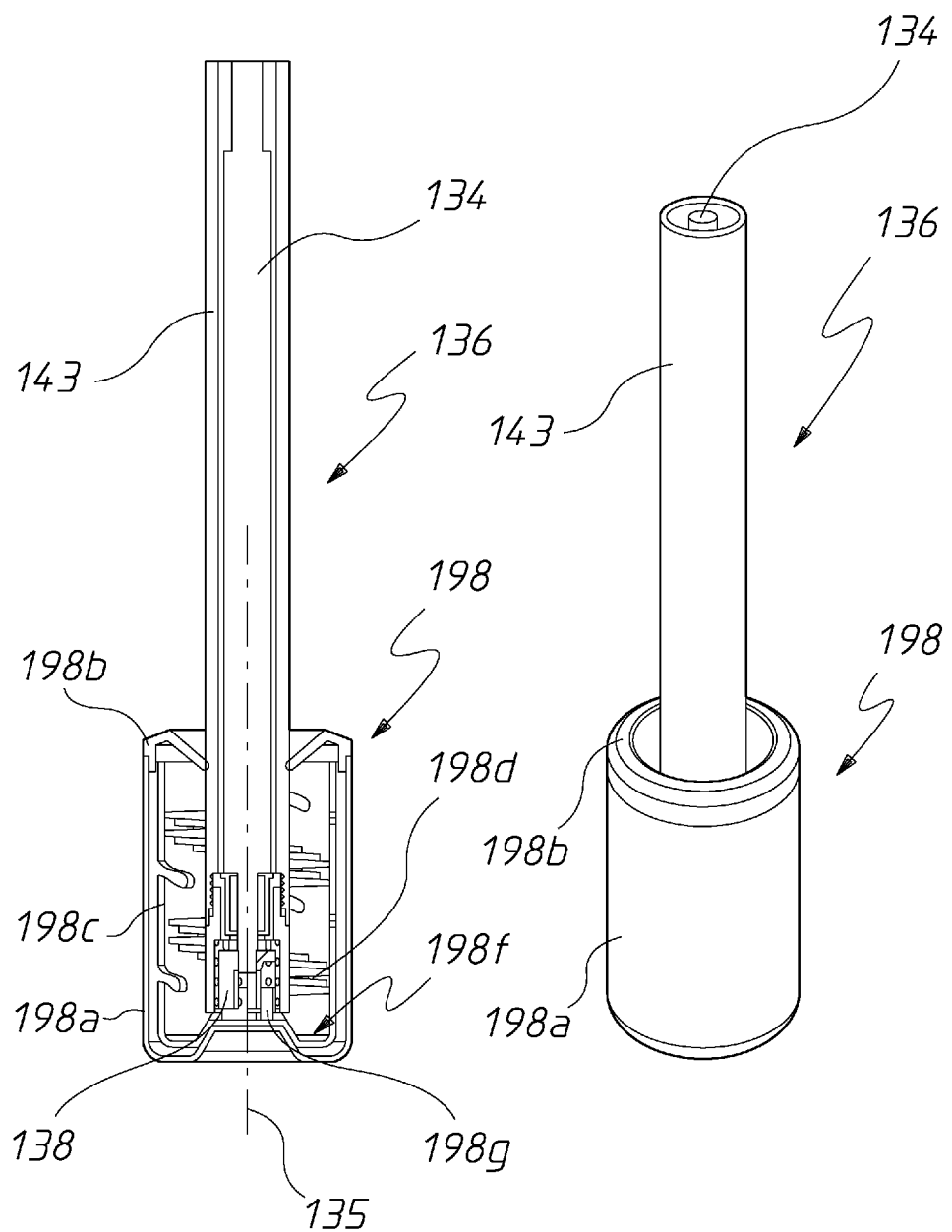
FIG. 31 is a schematic sectioned side elevation view of a second embodiment of a cleaning device of the milk frother of FIG. 23.
FIG. 32 is a schematic isometric view of the cleaning device of FIG. 31.
Figures 33, 34:
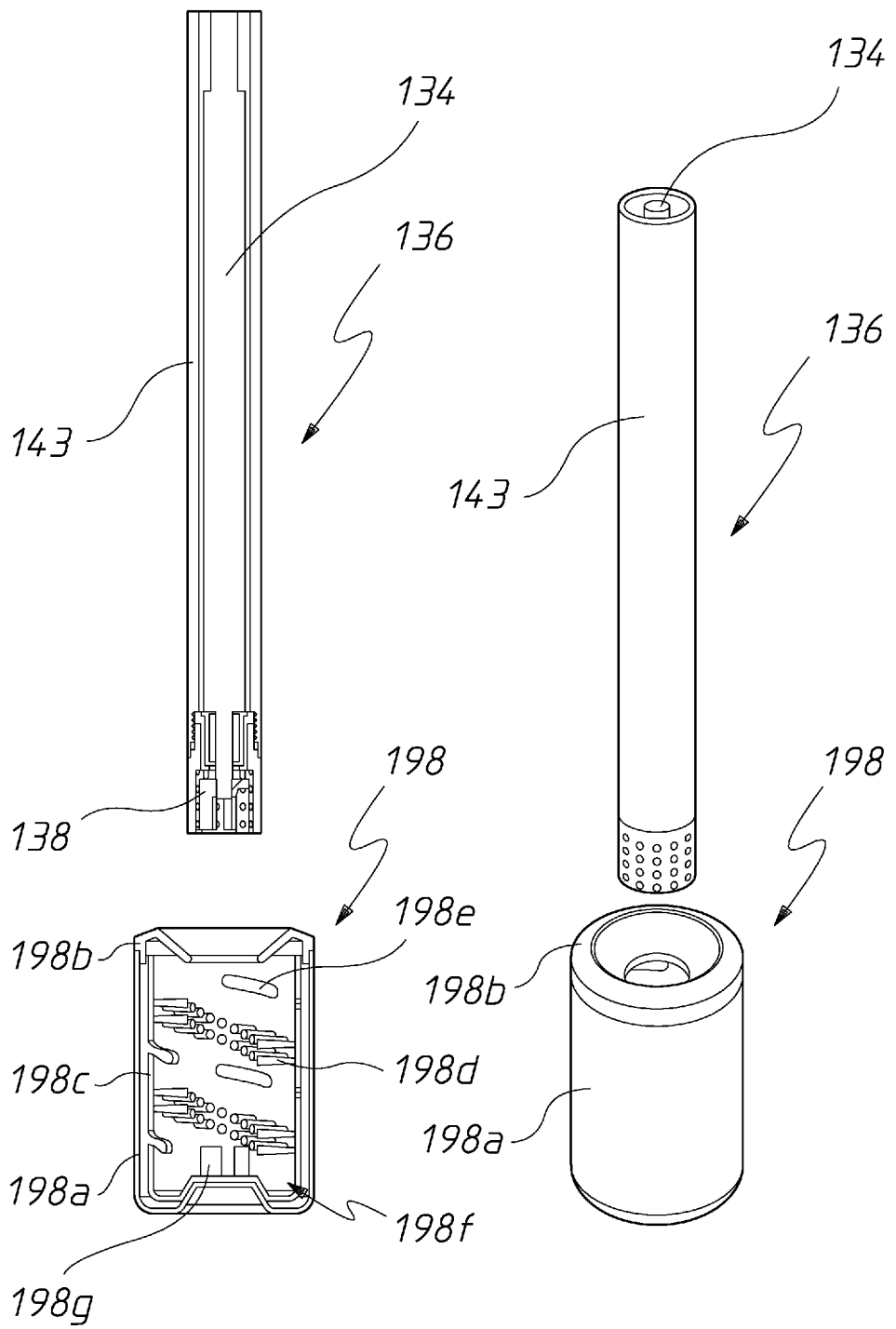
FIG. 33 is a further schematic sectioned side elevation view of the cleaning device of FIG. 32.
FIG. 34 is a further schematic isometric view of the cleaning device of FIG. 31.
Figures 35, 36:
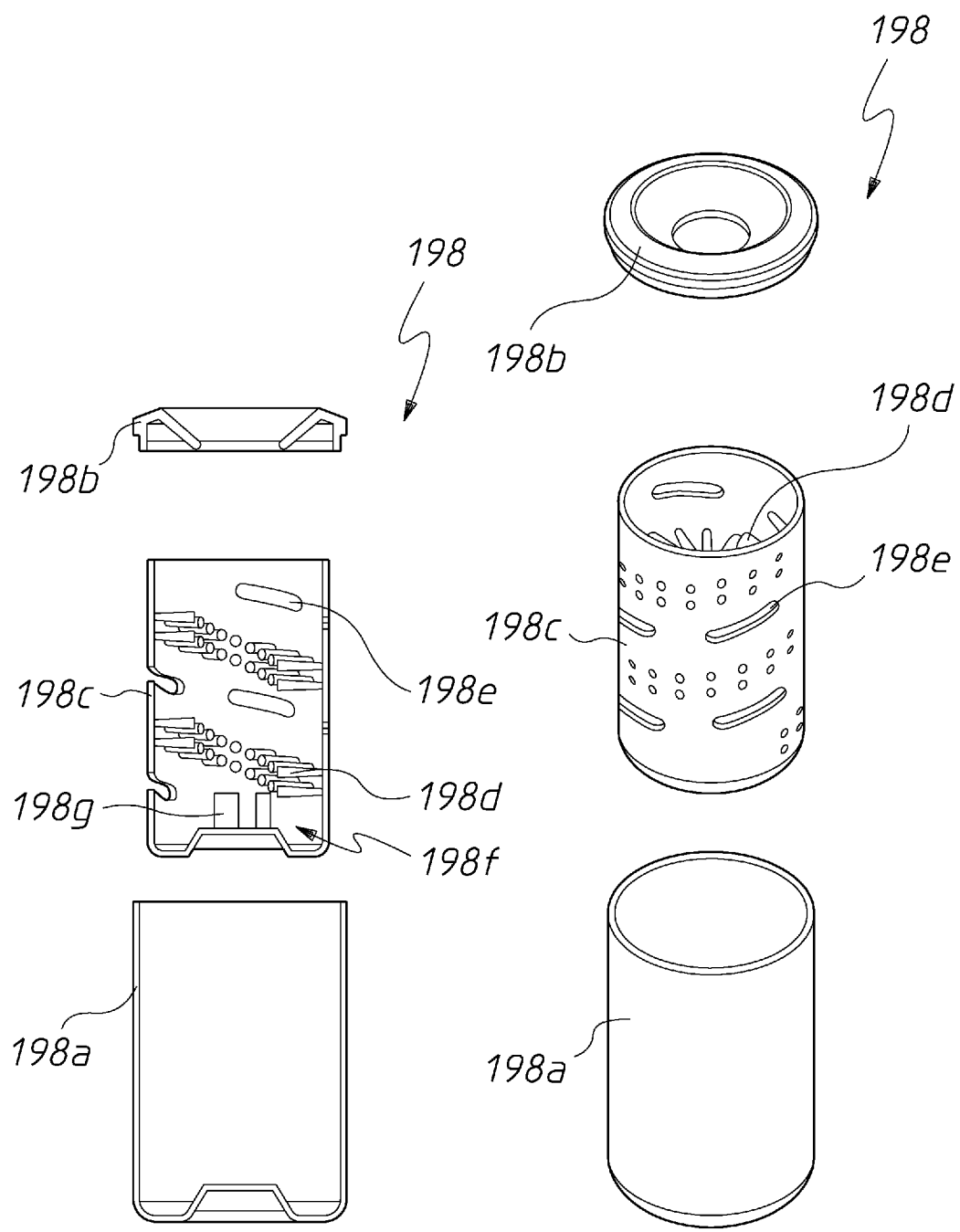
FIG. 35 is a further schematic sectioned side elevation view of the cleaning device of FIG. 31.
FIG. 36 is a further schematic isometric view of the cleaning device of FIG. 31.
Figure 37:
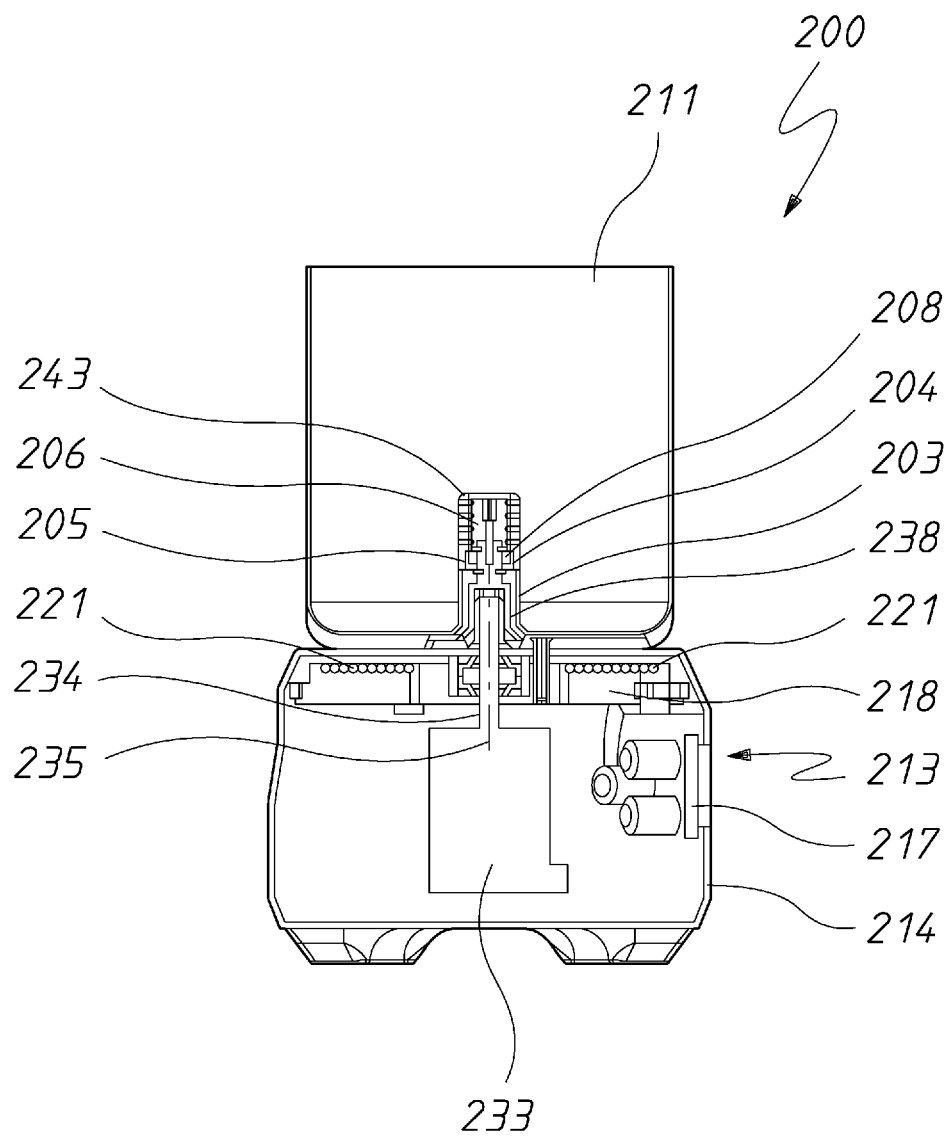
FIG. 37 is a schematic parts sectioned side elevation view of a third embodiment of a milk frother.
Figure 38:
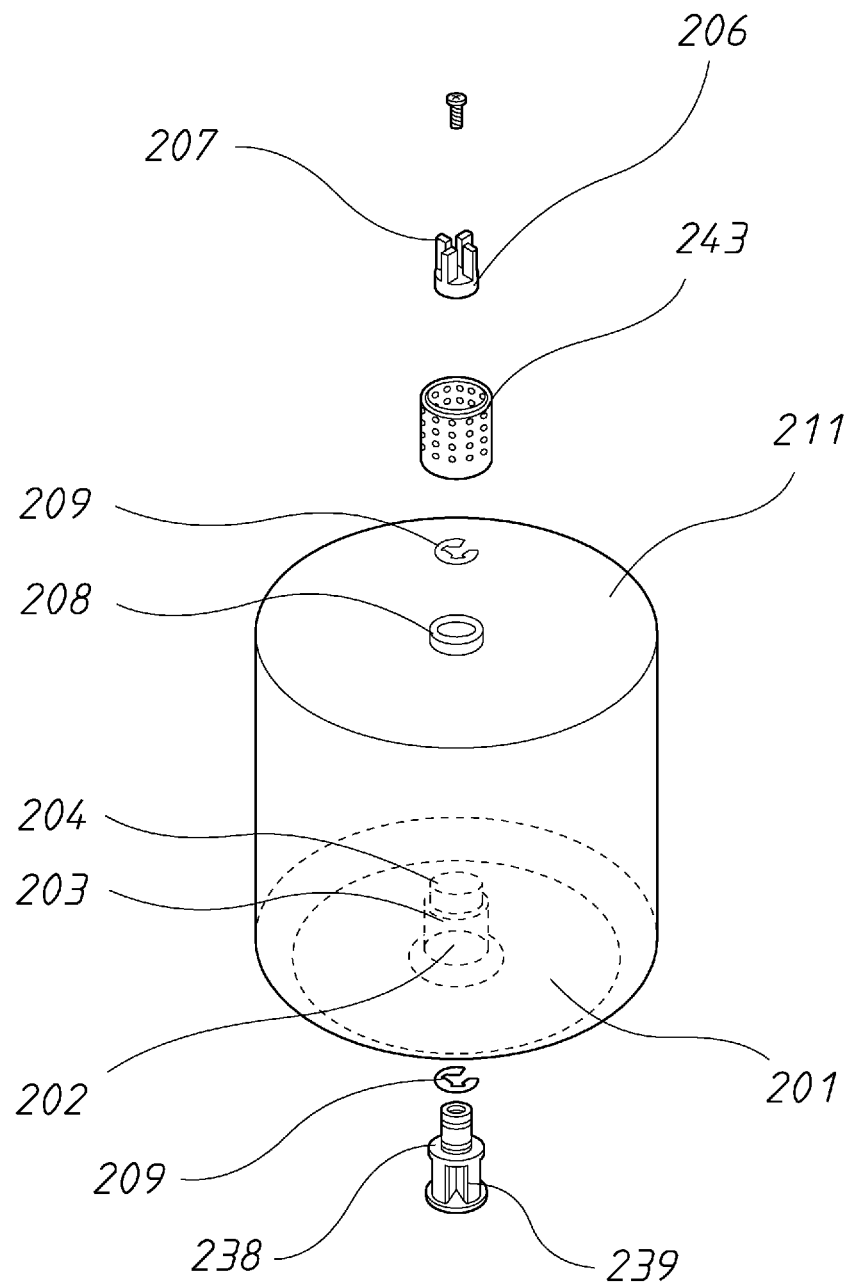
FIG. 38 is a schematic isometric view of a frothing device and container of FIG. 25.

FIGS. 23 and 24 show a second embodiment of a milk frother 100, which operates in generally the same manner as the milk frother 10 described above, with like reference numerals being used to indicate like features. In this embodiment, the milk frother 100 includes a fluid pump 185 and a source of fluid mounted in the housing 114 and operatively associated with the circuitry 118. It will be appreciated that the source of fluid is a fluid tank 186 mounted in the housing 114, or alternatively be a mains fluid supply external to the housing 114. The milk frother 100 also includes a fluid sensor 187 mounted in the housing 114 and operatively associated with the circuitry 118. Also mounted in the housing 114 is an air pump 188, an air pressure sensor 189 and switches 190, 191 also operatively associated with the circuitry 118. The circuitry 118 and the motor 133 of the frothing assembly 121 are powered by a power supply 184 within the housing 114.

The fluid pump 185 is connected to the source of fluid (i.e. the fluid tank 186 or the mains fluid supply) and the fluid sensor 187. Fluid is added to the fluid tank 186 via an opening (not shown) in the housing 114. The circuitry 118 also operates the fluid sensor 187 to detect the amount of fluid within the fluid tank 186 and alerts the user, via the user interface 117, if the amount of fluid detected is low.

The circuitry 118 operates the air pump 188 to draw air from an opening (not shown) in a side wall of the housing 114. The air pump 188 is connected to the air pressure sensor 189 to detect the amount of air that is being drawn into the air pump 188. It is envisaged that the circuitry 118 may additionally include other forms of sensors, such as a speed sensor to detect a motor speed of the air pump 188 and predict the amount of air that is being drawn into the air pump 188.

The fluid pump 185 is connected to a hollow channel 192 of the central longitudinal shaft 137 of the frothing device 136 by way of a fluid conduit 193. The hollow channel 192 includes an opening connected to the impeller/rotor 138. The air pump 188 is also connected to the hollow channel 192 by way of an air conduit 194. Following use of the milk frother 100, the circuitry 118 operates the fluid pump 185 and the air pump 188 to pump fluid and air (either separately or simultaneously) into the hollow channel 192, so as to purge and thereby clean the internal and external surfaces of the impeller/rotor 138. It will be appreciated that in other embodiments (not shown), the hollow channel 192 of the central longitudinal shaft 137 is connected directly to the source of fluid (e.g. directly to the fluid tank 186 or to the mains fluid supply via a manually operable valve). When connected to the mains fluid supply, the valve may be operable to introduce fluid from the mains fluid supply into the hollow channel 192 to purge and thereby clean the internal and external surfaces of the impeller/rotor 138.

It will be appreciated that the control of the fluid sensor 187, the pressure sensor 189, the fluid pump 185 and the air pump 188 is facilitated by the switches 190 and 191.

In the embodiment of FIG. 24, the circuitry 118, the fluid pump 185, the fluid tank 186, the fluid sensor 187, the air pump 188, the air pressure sensor 189 and the switches 190, 191 are mounted in a housing 195 and located above the motor 133 and the frothing device 136, instead of in the housing 114 of the base assembly 113. In this embodiment, the fluid pump 185 is connected to a fluid reservoir 196 which is located externally of the housing 195. The power supply 184 is also located externally of the housing 195.

In FIGS. 25 to 30 there is schematically depicted a first embodiment of a cleaning device 197 of the milk frother 100. The cleaning device 197 is mounted to the perforated member 143 of the frothing device 136. The cleaning device 197 includes a container 197a, which is mounted to the perforated member 143 by way of an associated lid 197b. The lid 197b is removable engageable with the container 197a by way of a snap-fitting engagement. The container 197a is adapted to receive and hold a fluid (e.g. water or cleaning solution). The frothing device 136 may be operable to agitate the fluid held within the container 197a, thereby cleaning the internal and external surfaces of the impeller/rotor 138, as well as the surfaces of the perforated member 143.

In FIGS. 31 to 36 there is schematically depicted a second embodiment of a cleaning device 198 of the milk frother 100, which functions in generally the same manner as the cleaning device 197 described above. However, in this embodiment, the cleaning device 198 includes an outer container 198a, an associated lid 198b and an inner container 198c. The inner container 198c is mounted within the outer container 198a and includes a plurality of protrusions 198d extending radially inwardly from the wall of the inner container 198c. The inner container 198c also includes a plurality of perforations 198e arranged in space relation to the plurality of protrusions 198d. The plurality of protrusions 198d are engageable with the perforated member 143. The inner container 198c and the outer container 198a are both adapted to receive and hold a fluid.

The inner container 198c includes a base 198f and a plurality of base protrusions 198g extending upwardly from the base 198f. The plurality of base protrusions 198g are engageable with the impeller 138 of the frothing device 136. Engagement of the base protrusions 198g and operation of the impeller 138 causes the inner container 198c to also rotate about the longitudinal axis 135 of the shaft 134. The rotation causes friction between the protrusions 198d and the perforated member 143, whereby the protrusions 198d act in a similar manner to bristles on a brush. This action, in conjunction with the agitation of the fluid within the inner and outer containers 198c and 198a, facilitate the cleaning of the internal and external surfaces of the impeller 138.

FIGS. 37 to 40 show a third embodiment of a milk frother 200, which again operates in generally the same manner as the milk frothers 10 and 100 described above, with like reference numerals being used to indicate like features. However, in this embodiment of the milk frother 200, the frothing assembly 221 is located in the housing 214 of the base assembly 213, instead of being supported on the stem 120 of the first and second embodiments of the milk frothers 10 and 100 described above.

The frothing assembly 221 includes a motor 233 which rotatably drives a shaft 234 about a longitudinal axis 235 of the shaft 234, so as to have a rotational speed of about 5,500 to 13,500 rpm as with the milk frothers 10 and 100 described above. An impeller 238 is coupled to the shaft 234 so as to be driven thereby about the axis 235. The impeller 238 includes a plurality of protrusions 239 spaced angularly about the axis 235.

In this embodiment, the base 201 of the container 211 includes a channel 202 formed therein. The channel 202 is defined by a hollow space surrounded by a cylindrical wall 203 having outer screw threads 204 formed at an upper end thereof. The milk frother 200 includes a perforated member 243 having inner screw threads 205 which correspond to the outer screw threads 204 of the channel 202, thereby allowing the perforated member 243 to be screwed onto the channel 202 of the container 211. The hollow space of the channel 202 accommodates the impeller 238. Attached to the impeller 238 is an agitator member 206 having protrusions 207 that correspond to the protrusions 239 of the impeller 238 so as to provide a snug fit therebetween. Also coupled to the impeller 238 is a bearing 208 and washers 209 to provide balance and structural integrity to the impeller 238 and agitator member 206 whilst the shaft 234 is driven to rotate.

Figures 39, 40:
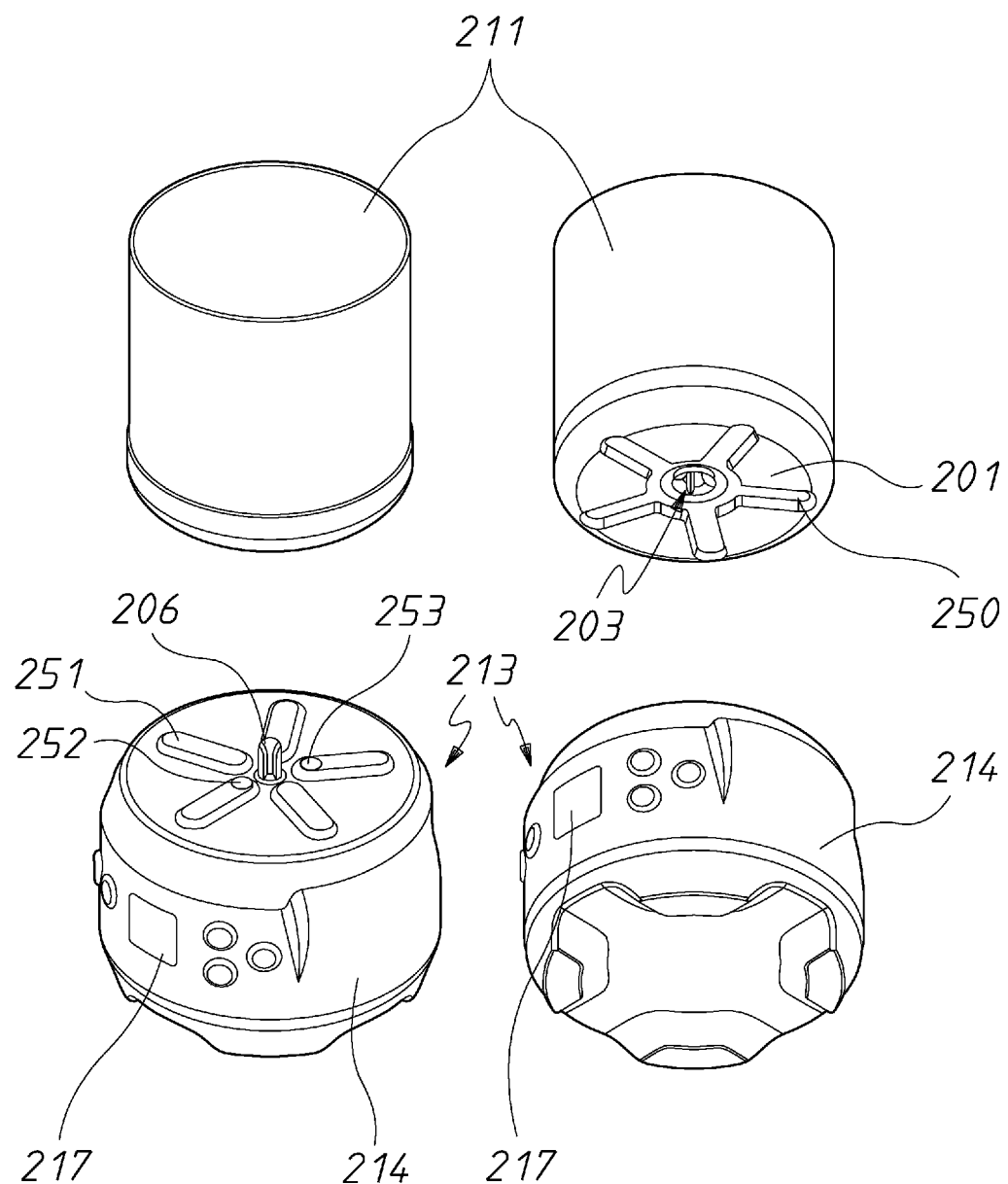
FIGS. 39 and 40 are schematic isometric views of the milk frother of FIG. 25.

As best shown in FIGS. 39 and 40, the container 211 includes a plurality of recesses 250 that correspond to a plurality of protrusions 251 on the housing 214 of the base assembly 213 so as to provide a snug fit when the container 211 is mounted onto the housing 214. Mounted on the protrusions 251 is a temperature sensor 252 and a weight sensor 253. Also mounted in the housing 214 of the base assembly 213 is an induction coil 254 (See FIG. 37) connected to the circuitry 218 to provide heat to the base 201, and thereby the container 211 so as to heat the milk 12 therein.

Figure 41:
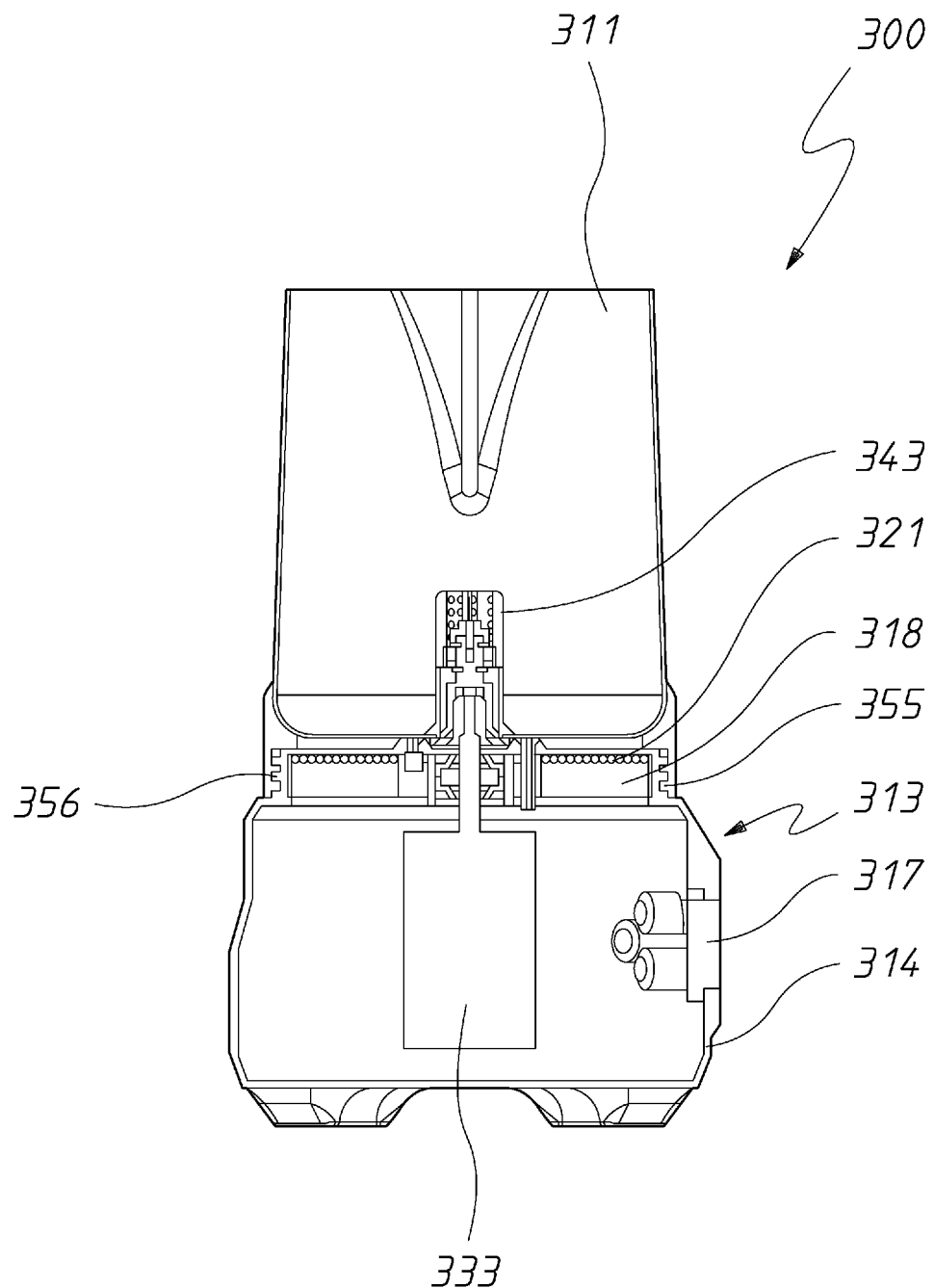
FIG. 41 is a schematic parts sectioned side elevation view of a fourth embodiment of a milk frother.
Figures 42, 43:
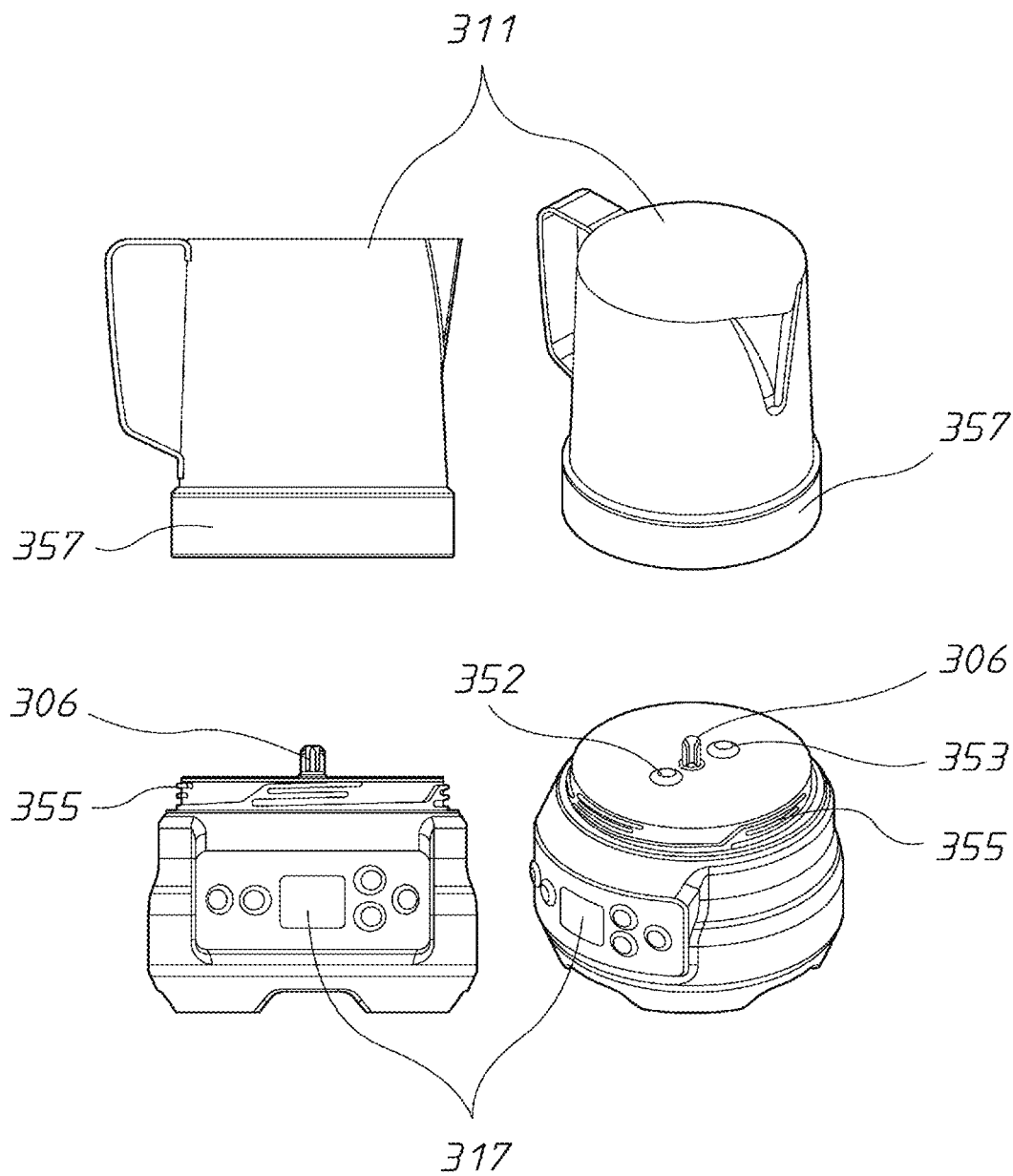
FIGS. 42 and 43 are schematic isometric views of the milk frother of FIG. 29.

FIGS. 41 to 43 show a third embodiment of a milk frother 300, which has a generally similar structure to the milk frother 200 described above, with like reference numerals being used to indicate like features. However, in this embodiment of the milk frother 300, the housing 314 of the base assembly 313 includes outer threads 355 which correspond to inner threads 356 of an attachment 357 that is attached to the container 311. The corresponding outer and inner threads 355 and 356 allow the container 311 to be screwed onto the housing 314 of the base assembly 313 and secured thereon.

Figure 44:
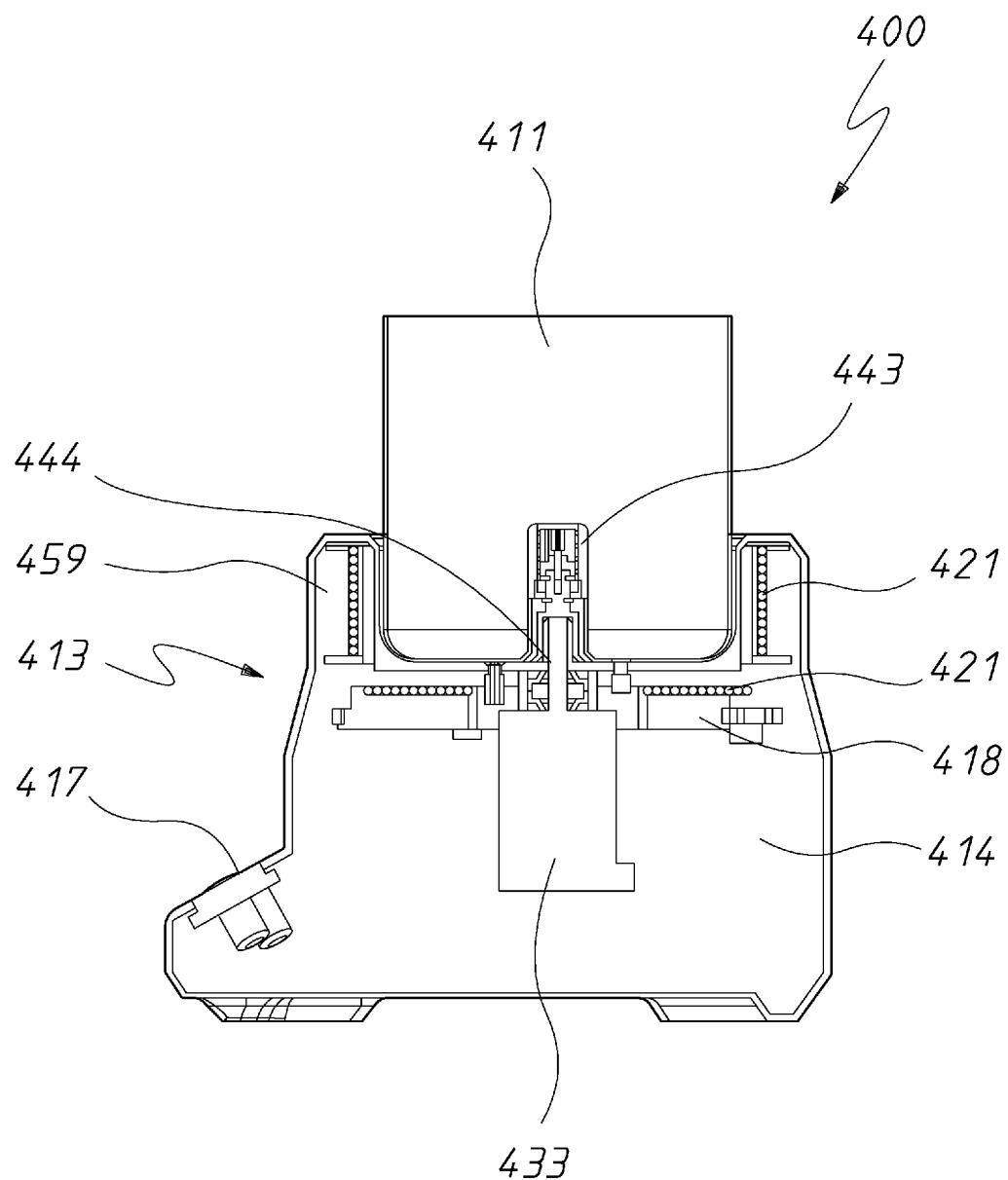
FIG. 44 is a schematic parts sectioned side elevation view of a fifth embodiment of a milk frother.
Figures 45, 46:
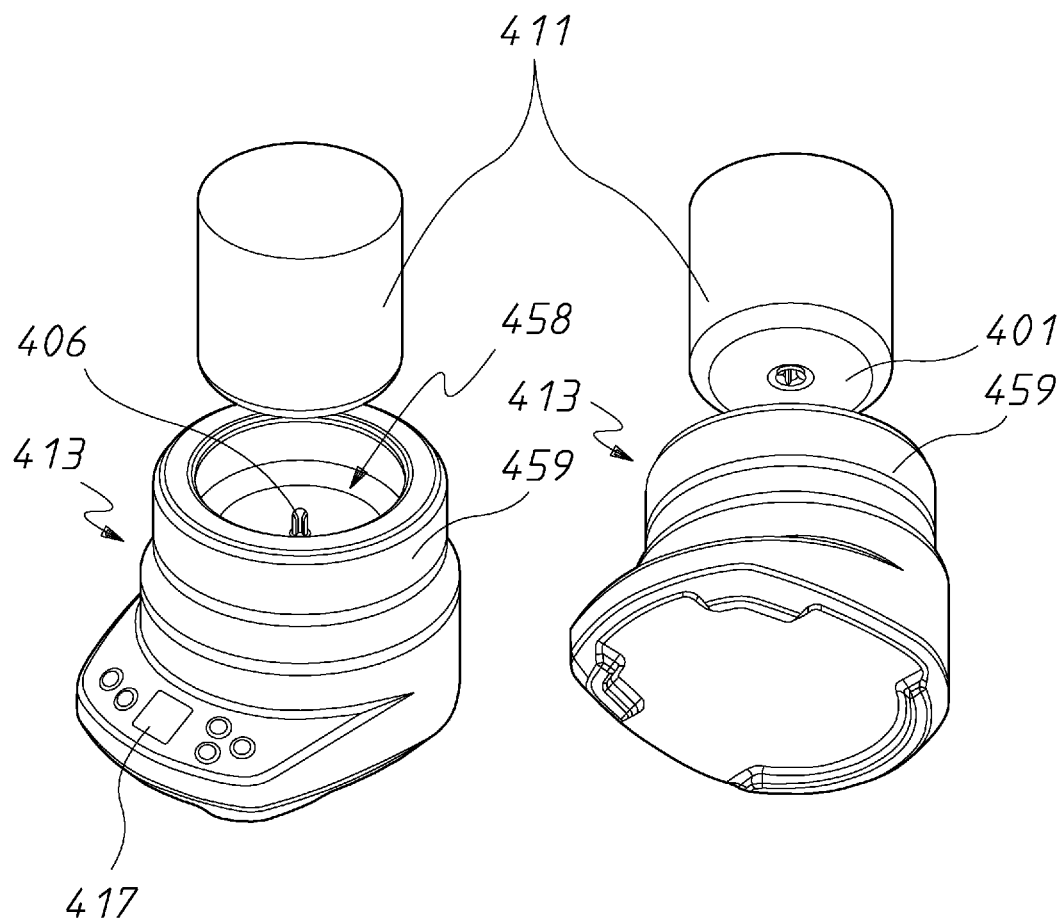
FIGS. 45 and 46 are schematic isometric views of the milk frother of FIG. 32.

FIGS. 44 to 46 show a fourth embodiment of a milk frother 400, which again has a generally similar structure to the milk frothers 200 and 300 described above, with like reference numerals being used to indicate like features. However, in this embodiment of the milk frother 400, the housing 414 of the base assembly 413 includes a recess 458 which is sized to receive a portion of the container 411 therein. The recess 458 includes a side wall 459 within which additional induction coils 421 are located, so as to provide additional heating of the milk 12 within the container 211.

The invention claimed is:

1. A frothing assembly to froth milk in a container, the assembly including:
    a body;
    a motor fixed to the body and having an output shaft that is rotatably driven about a longitudinal axis of the shaft;
    a frothing device rotatably driven by the shaft and to be submerged in the milk in the container; and
    a perforated member at least partly surrounding the frothing device and spaced from the frothing device by a clearance,
    wherein rotation of the frothing device is suitable to cause movement of milk in the clearance and movement of milk through the perforated member to be circulated back through the container and the clearance to cause frothing of the milk, wherein the frothing device includes a plurality of generally planar blades that are spaced angularly about said axis, and that have a direction of extension away from said axis that is inclined to a radial direction by an acute angle.

2. The frothing assembly of claim 1, wherein the perforated member has an end portion providing a plurality of passages through which the milk may pass.

3. The frothing assembly of claim 2, wherein said end portion is at least partly coextensive with the blades in the direction of said axis.

4. The frothing assembly of claim 2, wherein said end portion is substantially coextensive with the blades in the direction of said axis.

5. The frothing assembly of claim 1, wherein the frothing device and perforated member provides an assembly that is detachable with respect to the motor.

6. The frothing assembly of claim 1, wherein said clearance is annular, and is 0.5 to 1.00 mm.

7. The frothing assembly of claim 6, wherein the clearance is about 0.5 mm.

8. A frothing assembly to froth milk in a container, the assembly including:
  a body;
  a motor fixed to the body and having an output shaft that is rotatably driven about a longitudinal axis of the shaft;
  a frothing device rotatably driven by the shaft and to be submerged in the milk in the container; and
  a perforated member providing a plurality of passages the milk may pass, the perforated member at least partly surrounding the frothing device and spaced from the frothing device by a clearance, wherein the perforated member has an open end configured to provide fluid communication with the plurality of passages by way of the clearance;
  wherein rotation of the frothing device causes movement of milk in the clearance and movement of milk through the plurality of passages of the perforated member to be circulated back through the container, the open end of the perforated member and the clearance to cause frothing of the milk.

9. The frothing assembly of claim 8, wherein the longitudinal axis passes through the open end of the perforated member.

10. The frothing assembly of claim 8, wherein the open end of the perforated member is a fully open end.

11. The frothing assembly of claim 8, wherein the open end of the perforated member is orientated substantially perpendicular to the plurality of passages.

12. A frothing assembly to froth milk in a container, the assembly including:
  a body;
  a motor fixed to the body and having an output shaft that is rotatably driven about a longitudinal axis of the shaft;
  a frothing device rotatably driven by the shaft and to be submerged in the milk in the container; and
  a perforated member at least partly surrounding the frothing device and spaced from the frothing device by a clearance, wherein the frothing device and/or the output shaft are unsupported by the perforated member;
  wherein rotation of the frothing device causes movement of milk in the clearance and movement of milk through the perforated member to be circulated back through the container and the clearance to cause frothing of the milk.

13. The frothing assembly claim 12, wherein said clearance is annular, and is 0.5 to 1.00 mm.

14. The frothing assembly of claim 13, wherein the clearance is 0.5 mm.

* * * * *